United States Patent
Bar Oz et al.

(10) Patent No.: US 11,431,568 B2
(45) Date of Patent: Aug. 30, 2022

(54) DISCOVERY OF SOFTWARE BUS ARCHITECTURES

(71) Applicant: ServiceNow, Inc., Santa Clara, CA (US)

(72) Inventors: Tom Bar Oz, Herzliya (IL); Alexandra Feiguine, Sha'ar Efrayim (IL); Noam Biran, Kfar Menachem (IL); Hail Tal, Kohav Yair (IL); Aviya Aron, Shafir (IL); Asaf Garty, Sdei Hemed (IL); Daniel Badyan, Tel Aviv (IL)

(73) Assignee: ServiceNow, Inc., Santa Clara, CA (US)

( * ) Notice: Subject to any disclaimer, the term of this patent is extended or adjusted under 35 U.S.C. 154(b) by 412 days.

(21) Appl. No.: 16/228,312

(22) Filed: Dec. 20, 2018

(65) Prior Publication Data

US 2020/0204443 A1 Jun. 25, 2020

(51) Int. Cl.
*H04L 41/0853* (2022.01)
*G06F 16/23* (2019.01)
(Continued)

(52) U.S. Cl.
CPC ...... *H04L 41/0853* (2013.01); *G06F 16/2379* (2019.01); *H04L 41/04* (2013.01);
(Continued)

(58) Field of Classification Search
CPC ... H04L 41/12; H04L 41/046; H04L 41/0806; H04L 63/0281; H04L 41/0886;
(Continued)

(56) References Cited

U.S. PATENT DOCUMENTS 5,978,594 A 11/1999 Bonnell
6,321,229 B1 11/2001 Goldman
(Continued)

OTHER PUBLICATIONS

International Search Report and Written Opinion for PCT Application No. PCT/US2019/067187 dated Apr. 6, 2020; 13 pgs.
(Continued)

*Primary Examiner* — Scott B Christensen
(74) *Attorney, Agent, or Firm* — Fletcher Yoder PC

(57) ABSTRACT

A computing system includes a database and a discovery application. The discovery application obtains credentials for accessing a server hosting a software bus application which connects a plurality of applications within a managed network. The discovery application selects, based on a pattern corresponding to the software bus application, one or more files to access, transmits, to the server, instructions to access the one or more files, and receives therefrom data identifying a plurality of attributes of the software bus application. Based on this data, the discovery application transmits, to the server, instructions to identify communicative connections established between the plurality of software applications by way of the software bus application and receives therefrom data identifying the communicative connections. Based on (i) the plurality of attributes and (ii) the communicative connections, the discovery application generates a mapping that represents the communicative connections and stores the mapping in the database.

20 Claims, 12 Drawing Sheets

(51) Int. Cl.
*H04L 41/04* (2022.01)
*H04L 41/0806* (2022.01)
*H04L 67/568* (2022.01)
*H04L 67/00* (2022.01)
*H04L 69/18* (2022.01)
*H04L 67/01* (2022.01)

(52) U.S. Cl.
CPC ...... *H04L 41/0806* (2013.01); *H04L 67/2842* (2013.01); *H04L 67/34* (2013.01); *H04L 69/18* (2013.01); *H04L 67/42* (2013.01)

(58) Field of Classification Search
CPC . H04L 41/0823; H04L 41/0853; H04L 41/04; H04L 67/2842; H04L 67/34; H04L 69/18; H04L 67/42; G06F 16/2379; G06F 11/3006; G06F 11/3495; G06F 11/3404; G06F 11/3051; G06F 9/541; G06F 9/44505
See application file for complete search history.

(56) References Cited

U.S. PATENT DOCUMENTS

| | | | |
|---|---|---|---|
| 6,799,189 B2 | 9/2004 | Huxoll | |
| 6,816,898 B1 | 11/2004 | Scarpelli | |
| 6,895,586 B1 | 5/2005 | Brasher | |
| 7,020,706 B2 | 3/2006 | Cates | |
| 7,027,411 B1 | 4/2006 | Pulsipher | |
| 7,392,300 B2 | 6/2008 | Anantharangachar | |
| 7,603,318 B1 * | 10/2009 | Colosso | G06Q 30/06 705/51 |
| 7,617,073 B2 | 11/2009 | Non | |
| 7,685,167 B2 | 3/2010 | Mueller | |
| 7,716,353 B2 | 5/2010 | Golovinsky | |
| 7,769,718 B2 | 8/2010 | Murley | |
| 7,877,783 B1 | 1/2011 | Cline | |
| 7,925,981 B2 | 4/2011 | Pourheidari | |
| 7,933,927 B2 | 4/2011 | Dee | |
| 7,941,506 B2 | 5/2011 | Bonal | |
| 7,941,748 B1 * | 5/2011 | Sundermeyer | G06F 16/958 715/255 |
| 7,945,860 B2 | 5/2011 | Vambanepe | |
| 8,082,222 B2 | 12/2011 | Rangarajan | |
| 8,346,752 B2 | 1/2013 | Sirota | |
| 8,380,645 B2 | 2/2013 | Kowalski | |
| 8,402,127 B2 | 3/2013 | Solin | |
| 8,554,750 B2 | 10/2013 | Rangaranjan | |
| 8,612,408 B2 | 12/2013 | Trinon | |
| 8,646,093 B2 | 2/2014 | Myers | |
| 8,683,032 B2 | 3/2014 | Spinelli | |
| 8,745,040 B2 | 6/2014 | Kowalski | |
| 8,812,539 B2 | 8/2014 | Milousheff | |
| 8,818,994 B2 | 8/2014 | Kowalski | |
| 8,832,652 B2 | 9/2014 | Mueller | |
| 8,907,988 B2 | 12/2014 | Poston | |
| 9,015,188 B2 | 4/2015 | Behne | |
| 9,037,536 B2 | 5/2015 | Vos | |
| 9,065,783 B2 | 6/2015 | Ding | |
| 9,098,322 B2 | 8/2015 | Apte | |
| 9,122,552 B2 | 9/2015 | Whitney | |
| 9,137,115 B2 | 9/2015 | Mayfield | |
| 9,261,372 B2 | 2/2016 | Cline | |
| 9,317,327 B2 | 4/2016 | Apte | |
| 9,323,801 B2 | 4/2016 | Morozov | |
| 9,363,252 B2 | 6/2016 | Mueller | |
| 9,412,084 B2 | 9/2016 | Kowalski | |
| 9,467,344 B2 | 10/2016 | Gere | |
| 9,534,903 B2 | 1/2017 | Cline | |
| 9,535,737 B2 | 1/2017 | Joy | |
| 9,613,070 B2 | 4/2017 | Kumar | |
| 9,631,934 B2 | 4/2017 | Cline | |
| 9,645,833 B2 | 5/2017 | Mueller | |
| 9,654,473 B2 | 5/2017 | Miller | |
| 9,659,051 B2 | 5/2017 | Hutchins | |
| 9,766,935 B2 | 9/2017 | Kelkar | |
| 9,792,387 B2 | 10/2017 | George | |
| 9,805,322 B2 | 10/2017 | Kelkar | |
| 9,852,165 B2 | 12/2017 | Morozov | |
| 9,967,162 B2 | 5/2018 | Spinelli | |
| 10,002,203 B2 | 6/2018 | George | |
| 10,044,566 B1 * | 8/2018 | Grisco | H04L 41/12 |
| 2003/0002492 A1 * | 1/2003 | Gallagher | H04L 67/1097 370/360 |
| 2007/0226177 A1 * | 9/2007 | Barsness | G06F 16/2282 |
| 2010/0312820 A1 * | 12/2010 | Goffinet | G06Q 30/02 709/203 |
| 2012/0159468 A1 * | 6/2012 | Joshi | G06F 8/61 717/172 |
| 2012/0265871 A1 * | 10/2012 | Dowell | H04L 67/16 709/224 |
| 2013/0097138 A1 * | 4/2013 | Barkol | G06F 16/24544 707/706 |
| 2014/0006626 A1 * | 1/2014 | Breiter | G06F 9/50 709/226 |
| 2014/0025788 A1 * | 1/2014 | Mahadevan | H04L 43/08 709/220 |
| 2014/0207927 A1 * | 7/2014 | Fichtenholtz | H04L 67/10 709/223 |
| 2014/0289189 A1 * | 9/2014 | Chan | H04L 69/04 707/610 |
| 2015/0081641 A1 * | 3/2015 | Brewer | G06F 11/1458 707/654 |
| 2016/0210172 A1 * | 7/2016 | Ramachandra | G06F 9/5072 |
| 2018/0123940 A1 | 5/2018 | Rimar et al. | |
| 2018/0181451 A1 * | 6/2018 | Saxena | G06K 9/6267 |
| 2018/0210955 A1 * | 7/2018 | Crabtree | G06F 16/24568 |
| 2018/0287920 A1 * | 10/2018 | Sanganabhatla | H04L 67/2819 |
| 2018/0314518 A1 | 11/2018 | Ari | |
| 2018/0324054 A1 | 11/2018 | Biran et al. | |
| 2019/0044953 A1 * | 2/2019 | Holsinger | H04L 63/0428 |

OTHER PUBLICATIONS

Tom Bar Oz, Alexandra Feiguine, Noam Biran, Hail Tal, Aviya Aron, Asaf Garty, Daniel Badyan, Red Hat JBoss Fuse discovery, ServiceNow Product Documentation, Published Jul. 27, 2018, Retrieved Oct. 22, 2018.

Tom Bar Oz, Noam Biran, Hail Tal, Aviya Aron, Robert Bitterfeld, Boris Erblat, Bary Solomon, IBM Informix Dynamic Server discovery, ServiceNow Product Documentation, Published Jul. 27, 2018, Retrieved Oct. 22, 2018.

* cited by examiner

DISCOVERY OF SOFTWARE BUS ARCHITECTURES

BACKGROUND

Computing devices, software applications, and databases that make up a managed computer network may be discovered and representations thereof may be stored in a database in configuration items. The relationships between these configuration items may be discovered and stored in configuration items as well. The stored configuration items may later be retrieved and used to generate a visualization of a state or arrangement of components within the managed network. Discovering a computing device, database, or software application involves developing software processes that are capable of interacting with the devices, databases, or applications in order to gather information needed for detection, classification, and/or identification thereof.

SUMMARY

Discovery patterns may be used by a discovery application to identify computing devices, software applications, databases, and various other entities within a managed network. The discovery patterns may define rules and operations to be followed or executed by a discovery application in order to discover a particular entity. Discovery patterns may be tailored to, and thus configured to discover, specific types or versions of these entities. For example, a discovery pattern may be configured to discover a specific version of a particular software application released by a particular vendor or software product provider by accounting for the manner in which the particular software application stores and/or provides the information of interest in the discovery process. Thus, discovering multiple different software applications may necessitate multiple different discovery patterns, each tailored to the specific application sought to be discovered.

However, in some cases, a plurality of software applications may be communicatively connected by way of a software bus application. The software bus application may coordinate the communications of the plurality of software applications. For example, when some of the software applications utilize different communication protocols than others, the software bus application may facilitate communication therebetween by translating exchanged messages between the different communication protocols. Thus, the software bus may allow the software applications to communicate without needing to implement a single uniform communication protocol or standard or to support the protocols of other applications.

Since the software bus application is aware of each software application connected thereto, each of these software applications may be discoverable by way of the software bus application. That is, the embodiments herein described can replace or enhance discovery of individual software applications (e.g., discovering each of these software applications independently by using different, application-specific discovery patterns) by discovering the applications collectively based on data stored by the software bus application.

Accordingly, the discovery application may be configured to discover the software bus application, the server device on which it is installed, and any of the software applications that use the software bus. The discovery process of the software bus and the applications interconnected thereby may be defined or facilitated by a corresponding discovery pattern configured to collect the information needed for detection, classification, and mapping of aspects of the software bus application and the applications interconnected thereby. The discovery pattern may define, for example, software processes associated with the software bus application, directories in which the software bus stores files, files which contain information of interest, and commands configured to cause the software bus application to generate data of interest. Different discovery patterns may be available, each tailored to a different provider, type, or version of the software bus application.

Additionally, discovery patterns may be used independently of one another. That is, a discovery pattern tailored to a particular software application may be configured to discover the particular software application without relying on other discovery patterns or data gathered thereby. However, in some cases, different software products may coordinate with each other during operation, thereby exhibiting additional relationships. Such relationships might not be discoverable by using the respective discovery patterns for these products or applications independently.

One example where such additional relationships may be discoverable by using multiple discovery patterns, or the data gathered thereby, in combination involves the software bus application and a database manager. The database manager may coordinate multiple secondary databases that store data on behalf of the software bus application and/or the software applications interconnected thereby. Notably, information stored by the database manager may be used to discover the secondary databases, much like information stored by the software bus application is used to discover the software applications interconnected thereby. This approach may replace or enhance discovery of individual secondary databases by discovering the secondary databases collectively based on data stored by the database manager.

The software applications may communicate with the secondary databases by channeling communications through the software bus application and the database manager, rather than communicating with one another directly. Thus, discovery patterns used independently may be able to discover a communicative relationship between the software bus application and the database manager. For example, transmission of a network packet between the software bus and the database manager may indicate a communicative relationship.

However, the specific communicative relationships between the software applications and the secondary databases might not be discoverable in this manner. Namely, because the network packet is exchanged between the software bus and the database manager, rather than between a software application and a secondary database directly, the endpoints of this communication might not be apparent from information stored in the network packet. Rather, data in the network packet may be routed between the software bus and the applications, as well as between the database manager and the secondary databases, by internal communications that might not be readily visible. Alternatively, the data in this original network packet may be modified or adjusted by the software bus or the database manager before being sent on to the endpoint by way of a different network packet, which might not be readily mappable to the original network packet.

The software bus and the database manger may, however, track these internal communications and/or transformations of data between network packets. By correlating or mapping the communications generated and tracked by the software bus and the database manager, the discovery application may determine the specific secondary database and the specific software application between which a series of communications is exchanged. Thus, by using the discovery patterns for the software bus and the database manager in combination, the discovery application may map specific software applications to one or more corresponding secondary databases.

To that end, a discovery pattern for the database manager may be configured to cause the database manager to identify any modifications made to the secondary databases and the times at which these modifications took place. In some implementations, this information may be stored in catalogs associated with the secondary databases. Namely, a catalog of a particular secondary database may indicate the times at which the particular secondary database was accessed or modified. By correlating the access times and/or modification times of secondary databases with the times at which different network packets were transmitted to or received by the database manager, the discovery application may determine the particular software application that uses the particular secondary database. Such repeated correlation between the secondary databases and the software applications may allow for additional relationships to be discovered and existing relationships to be strengthened or validated. Notably, the catalogs of the secondary databases may be mapped to the database manager by the discovery application to indicate the communicate relationships therebetween.

Accordingly, a first example embodiment involves a computing system that includes a configuration management database (CMDB) disposed within a computational instance of a remote network management platform. The computational instance is associated with a managed network that includes a plurality of software applications communicatively connected by way of a software bus application. The computing system also includes a discovery application configured to obtain credentials for remotely accessing a server device that (i) is disposed in the managed network and (ii) hosts the software bus application. The discovery application is also configured to select, based on a pattern corresponding to the software bus application, one or more files to access and transmit, to the server device, instructions to access the one or more files. The discovery application is additionally configured to receive, from the server device, data identifying a plurality of attributes of the software bus application determined by accessing the one or more files. The discovery application is further configured to, based on the data identifying the plurality of attributes, transmit, to the server device, instructions to identify communicative connections established between the plurality of software applications by way of the software bus application and receive, from the server device, data identifying the communicative connections. The discovery application is yet further configured to, based on (i) the plurality of attributes and (ii) the communicative connections, generate a mapping that represents the communicative connections and store, in the CMDB, the mapping in one or more configuration items.

In a second example embodiment, a method includes obtaining, by a computing system associated with a remote network management platform that is associated with a managed network, credentials for remotely accessing a server device that (i) is disposed in the managed network and (ii) hosts a software bus application. The managed network includes a plurality of software applications communicatively connected by way of the software bus application. The method also includes selecting, by the computing system and based on a pattern corresponding to the software bus application, one or more files to access and transmitting, by the computing system and to the server device, instructions to access the one or more files. The method additionally includes receiving, by the computing system and from the server device, data identifying a plurality of attributes of the software bus application determined by accessing the one or more files. The method further includes, based on the data identifying the plurality of attributes, transmitting, by the computing system and to the server device, instructions to identify communicative connections established between the plurality of software applications by way of the software bus application, and receiving, by the computing system and from the server device, data identifying the communicative connections. The method yet further includes, based on (i) the plurality of attributes and (ii) the communicative connections, generating, by the computing system, a mapping that represents the communicative connections and storing, in a CMDB disposed within the remote network management platform, the mapping in one or more configuration items.

In a third example embodiment, an article of manufacture may include a non-transitory computer-readable medium, having stored thereon program instructions that, upon execution by a computing system, cause the computing system to perform operations in accordance with the second example embodiment.

In a fourth example embodiment, a computing system may include at least one processor, as well as memory and program instructions. The program instructions may be stored in the memory, and upon execution by the at least one processor, cause the computing system to perform operations in accordance with the second example embodiment.

In a fifth example embodiment, a system may include various means for carrying out each of the operations of the second example embodiment.

In a sixth example embodiment, a computing system includes a configuration management database (CMDB) disposed within a computational instance of a remote network management platform. The computational instance is associated with a managed network. The managed network includes a database manager hosted on a server device. The database manager is configured to manage one or more secondary databases that are configured to store data for software applications executable by the managed network. The computing system also includes a discovery application configured to perform operations. The operations include identifying a type of the database manager by causing the server device to execute a command configured to cause the database manager to identify the type thereof. The operations also include selecting, based on a pattern corresponding to the type of the database manager, one or more additional commands. The operations additionally include determining respective database catalogs of the one or more secondary databases by (i) causing the server device to execute the one or more additional commands and (ii) receiving, from the server device, data identifying the respective database catalogs of the one or more secondary databases. Each database catalog identifies a structure of a corresponding secondary database of the one or more secondary databases. The operations further include generating, based on the received data, a mapping between the database manager and each of the respective database catalogs of the one or more secondary databases. The operations yet further include storing, in the CMDB, the generated mapping in one or more configuration items.

In a seventh example embodiment, a method includes identifying, by a computing system, a type of a database manager hosted by a server device associated with a managed network. The database manager is configured to manage one or more secondary databases that are configured to store data for software applications executable by the managed network. Identifying the type of the database manager involves causing the server device to execute a command configured to cause the database manager to identifying the type thereof. The method also includes selecting, by the computing system and based on a pattern corresponding to the type of the database manager, one or more additional commands. The method additionally includes determining, by the computing system, respective database catalogs of the one or more secondary databases by (i) causing the server device to execute the one or more additional commands and (ii) receiving, from the server device, data identifying the respective database catalogs of the one or more secondary databases. Each database catalog identifies a structure of a corresponding secondary database of the one or more secondary databases. The method further includes generating, by the computing system and based on the received data, a mapping between the database manager and each of the respective database catalogs of the one or more secondary databases. The method yet further includes storing, in a CMDB that is associated with the managed network and disposed within a computational instance of a remote network management platform, the generated mapping as one or more configuration items.

In an eighth example embodiment, an article of manufacture may include a non-transitory computer-readable medium, having stored thereon program instructions that, upon execution by a computing system, cause the computing system to perform operations in accordance with the seventh example embodiment.

In a ninth example embodiment, a computing system may include at least one processor, as well as memory and program instructions. The program instructions may be stored in the memory, and upon execution by the at least one processor, cause the computing system to perform operations in accordance with the seventh example embodiment.

In a tenth example embodiment, a system may include various means for carrying out each of the operations of the seventh example embodiment.

These as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
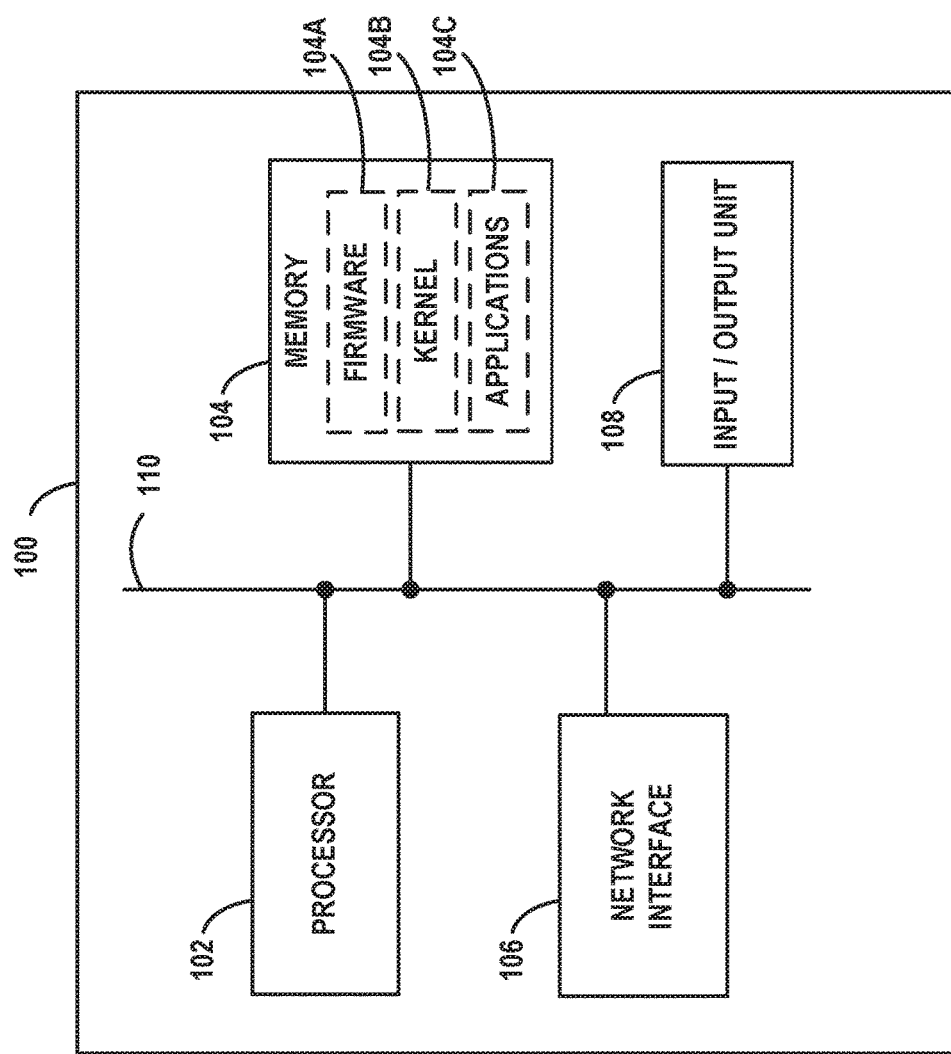
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data is stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with example computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more instances of computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
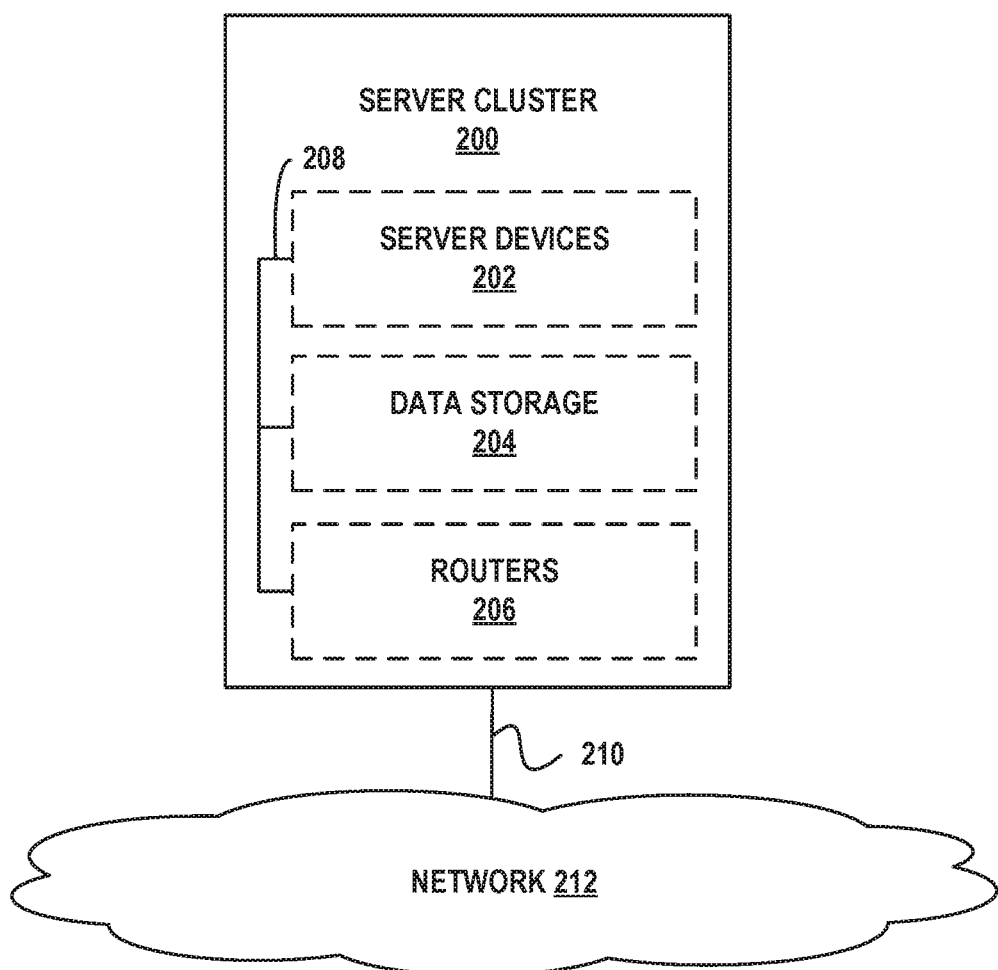
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between the server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. Example Remote Network Management Architecture

Figure 3:
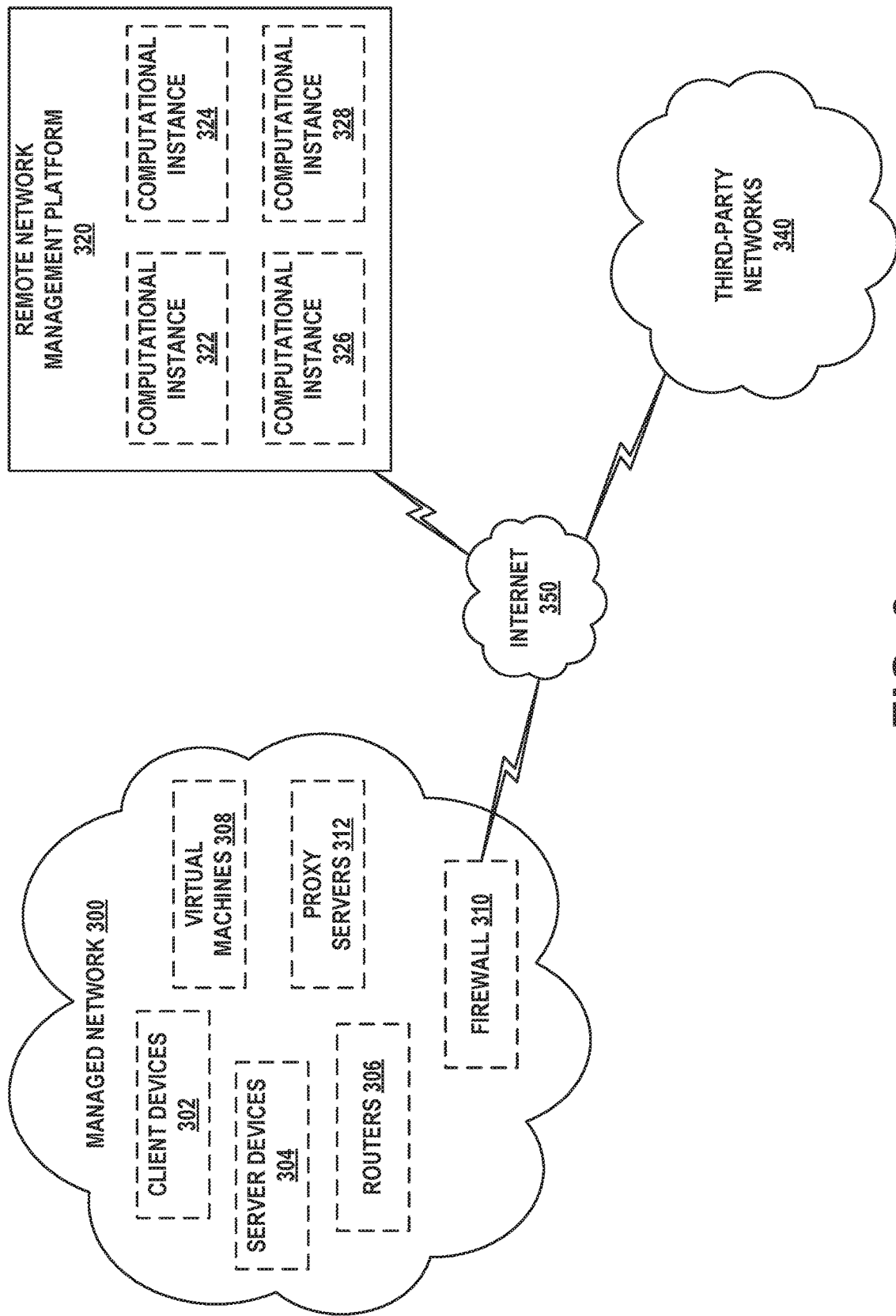
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by an entity for computing and communications tasks, as well as storage of data. Thus, managed network 300 may include various client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows with one or more database tables).

The multi-instance architecture of remote network management platform 320 is in contrast to conventional multi-tenant architectures, over which multi-instance architectures have several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of physical or virtual servers and database devices. Such a central instance may serve as a repository for data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® Azure. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
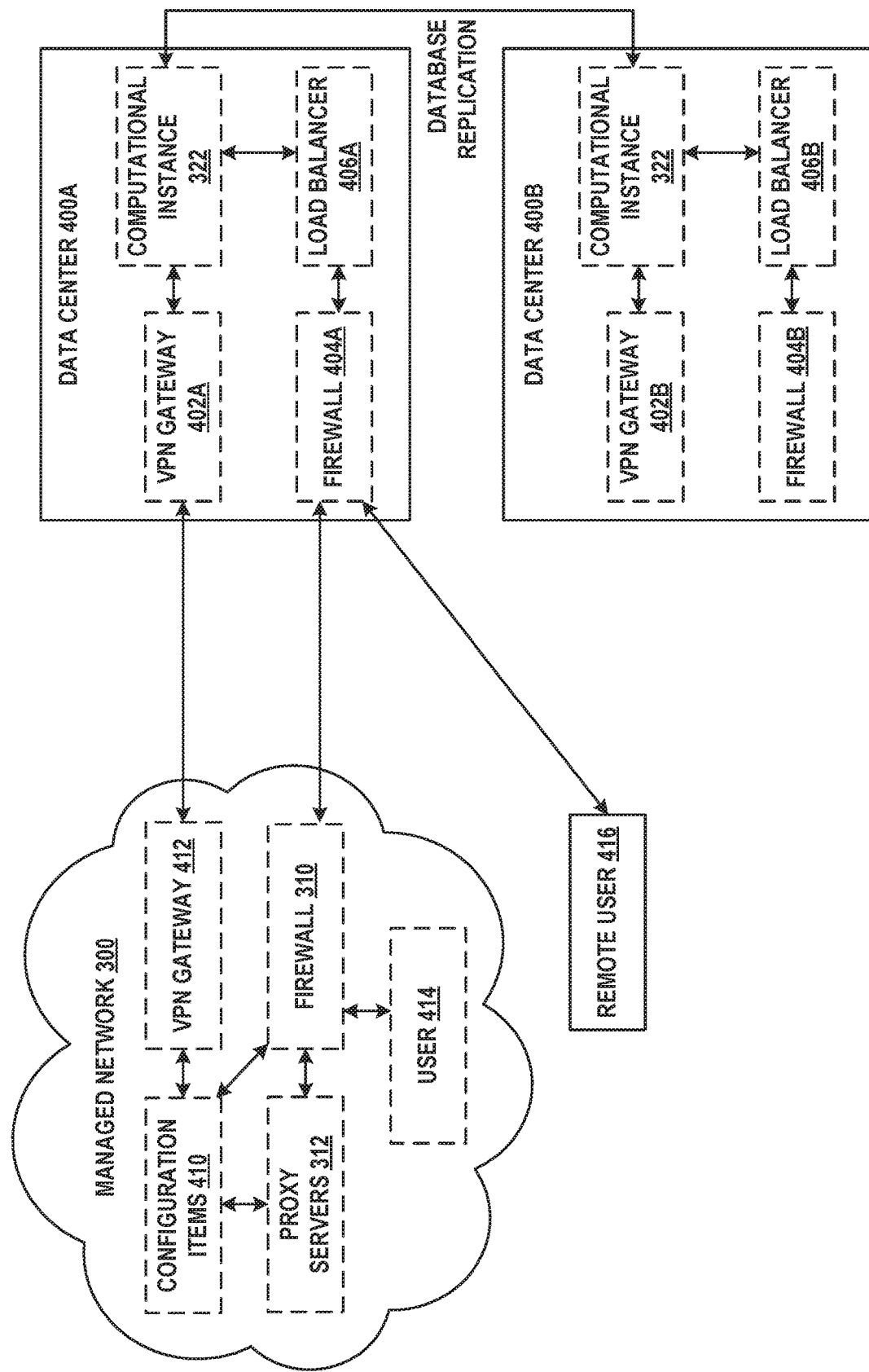
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
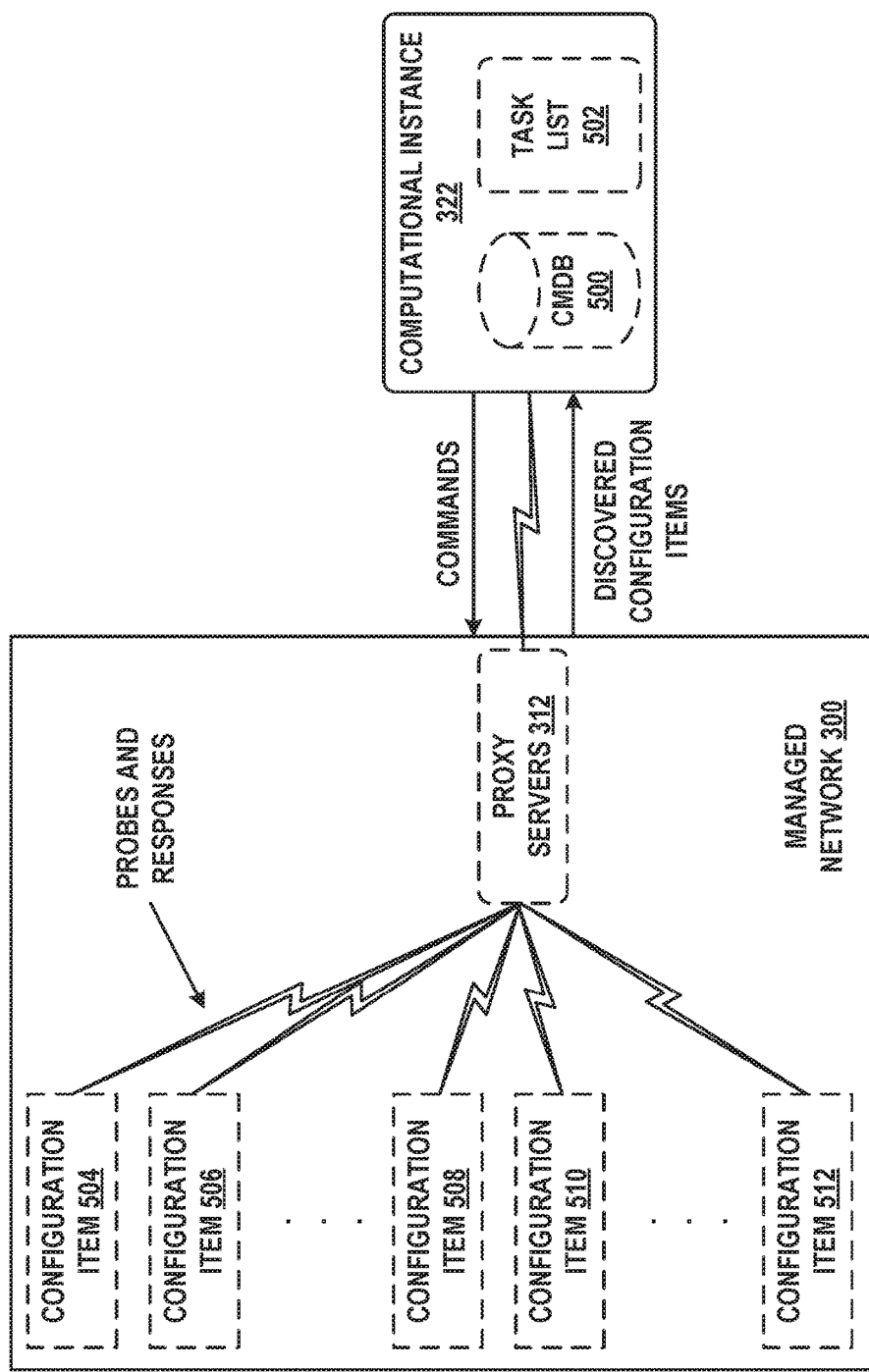
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
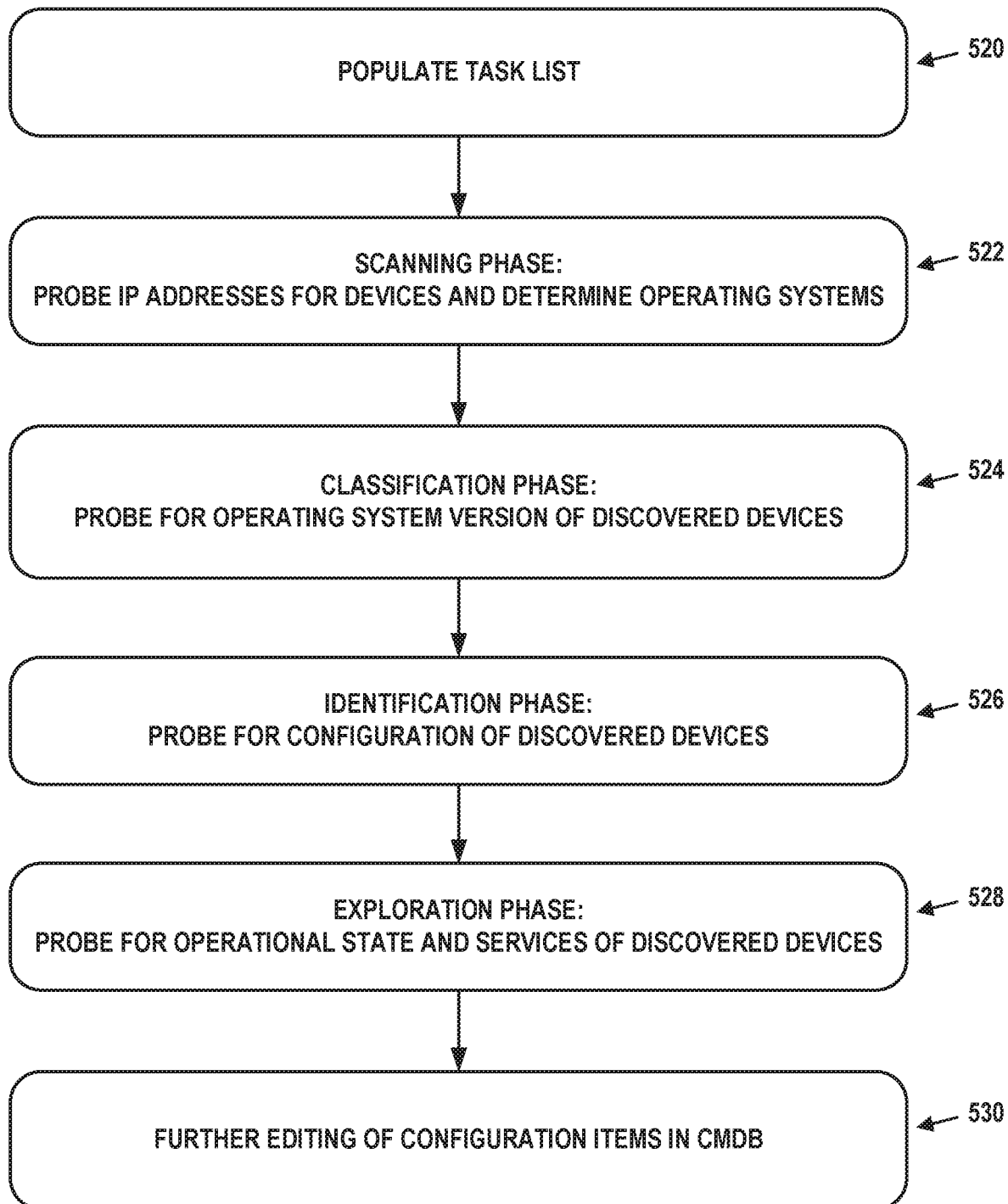
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. CMDB Identification Rules and Reconciliation

A CMDB, such as CMDB 500, provides a repository of configuration items, and when properly provisioned, can take on a key role in higher-layer applications deployed within or involving a computational instance. These applications may relate to enterprise IT service management, operations management, asset management, configuration management, compliance, and so on.

For example, an IT service management application may use information in the CMDB to determine applications and services that may be impacted by a component (e.g., a server device) that has malfunctioned, crashed, or is heavily loaded. Likewise, an asset management application may use information in the CMDB to determine which hardware and/or software components are being used to support particular enterprise applications. As a consequence of the importance of the CMDB, it is desirable for the information stored therein to be accurate, consistent, and up to date.

A CMDB may be populated in various ways. As discussed above, a discovery procedure may automatically store information related to configuration items in the CMDB. However, a CMDB can also be populated, as a whole or in part, by manual entry, configuration files, and third-party data sources. Given that multiple data sources may be able to update the CMDB at any time, it is possible that one data source may overwrite entries of another data source. Also, two data sources may each create slightly different entries for the same configuration item, resulting in a CMDB containing duplicate data. When either of these occurrences takes place, they can cause the health and utility of the CMDB to be reduced.

In order to mitigate this situation, these data sources might not write configuration items directly to the CMDB. Instead, they may write to an identification and reconciliation application programming interface (API). This API may use a set of configurable identification rules that can be used to uniquely identify configuration items and determine whether and how they are written to the CMDB.

In general, an identification rule specifies a set of configuration item attributes that can be used for this unique identification. Identification rules may also have priorities so that rules with higher priorities are considered before rules with lower priorities. Additionally, a rule may be independent, in that the rule identifies configuration items independently of other configuration items. Alternatively, the rule may be dependent, in that the rule first uses a metadata rule to identify a dependent configuration item.

Metadata rules describe which other configuration items are contained within a particular configuration item, or the host on which a particular configuration item is deployed. For example, a network directory service configuration item may contain a domain controller configuration item, while a web server application configuration item may be hosted on a server device configuration item.

A goal of each identification rule is to use a combination of attributes that can unambiguously distinguish a configuration item from all other configuration items, and is expected not to change during the lifetime of the configuration item. Some possible attributes for an example server device may include serial number, location, operating system, operating system version, memory capacity, and so on. If a rule specifies attributes that do not uniquely identify the configuration item, then multiple components may be represented as the same configuration item in the CMDB. Also, if a rule specifies attributes that change for a particular configuration item, duplicate configuration items may be created.

Thus, when a data source provides information regarding a configuration item to the identification and reconciliation API, the API may attempt to match the information with one or more rules. If a match is found, the configuration item is written to the CMDB. If a match is not found, the configuration item may be held for further analysis.

Configuration item reconciliation procedures may be used to ensure that only authoritative data sources are allowed to overwrite configuration item data in the CMDB. This reconciliation may also be rules-based. For instance, a reconciliation rule may specify that a particular data source is authoritative for a particular configuration item type and set of attributes. Then, the identification and reconciliation API will only permit this authoritative data source to write to the particular configuration item, and writes from unauthorized data sources may be prevented. Thus, the authorized data source becomes the single source of truth regarding the particular configuration item. In some cases, an unauthorized data source may be allowed to write to a configuration item if it is creating the configuration item or the attributes to which it is writing are empty.

Additionally, multiple data sources may be authoritative for the same configuration item or attributes thereof. To avoid ambiguities, these data sources may be assigned precedences that are taken into account during the writing of configuration items. For example, a secondary authorized data source may be able to write to a configuration item's attribute until a primary authorized data source writes to this attribute. Afterward, further writes to the attribute by the secondary authorized data source may be prevented.

In some cases, duplicate configuration items may be automatically detected by reconciliation procedures or in another fashion. These configuration items may be flagged for manual de-duplication.

VI. Example Discovery of a Software Bus Application

Discovery patterns define various operations, processes, and rules that may be used to discover computing devices, software application, databases, and other entities within a managed network. The discovery patterns may also discover the relationships between these entities. In the case of software applications, for example, a particular discovery pattern may be tailored to a corresponding software application to account for the manner in which information needed for discovery of that software application is stored and made accessible. Accordingly, discovering multiple different software applications, for example, ordinarily involves multiple different discovery patterns.

However, when a plurality of software applications is interconnected by a software bus application, the software bus application may already contain or be aware of the information (or at least a portion thereof) usable for discovery of each of these software applications. Similarly, when a plurality of databases is managed by a database manager, the database manager may contain information (or at least a portion thereof) usable for discovery of these databases. Accordingly, a discovery pattern for the software bus application may be configured to leverage the information stored by the software bus to simultaneously discover the software bus and the software application interconnected thereby. Similarly, a discovery pattern for the database manager may be configured to leverage the information stored by the database manager to simultaneously discover the database manager and the databases managed thereby.

Additionally, the discovery pattern for the software bus and the discovery pattern for the database manager may be used in combination to determine relationships between the software applications and the databases. When discovery patterns are used independently of one another, generation of configuration items using one discovery pattern does not depend on information gathered by another discovery pattern. However, this independent approach may sometimes omit discovery of certain relationships between configuration items. In the example at hand, this independent approach might not be able to identify the specific databases used by a particular software application interconnected by a software bus.

Specifically, because the databases and software applications communicate indirectly by way of the database manager and the software bus, the specific software application and/or database to or from which a network packet is addressed might not be identifiable based on analysis of network traffic alone. Namely, a portion of the routing of data may be internal to the software bus and/or database manager, and thus not observable by monitoring network traffic. However, the software bus and the database manager may track this information, allowing for network traffic to be mapped to specific applications and databases. Accordingly, the data gathered by one discovery pattern may be correlated with or mapped to data gathered by the other discovery pattern, thus allowing a discovery application to identify the databases used by a particular software application, and vice versa.

Figure 6:
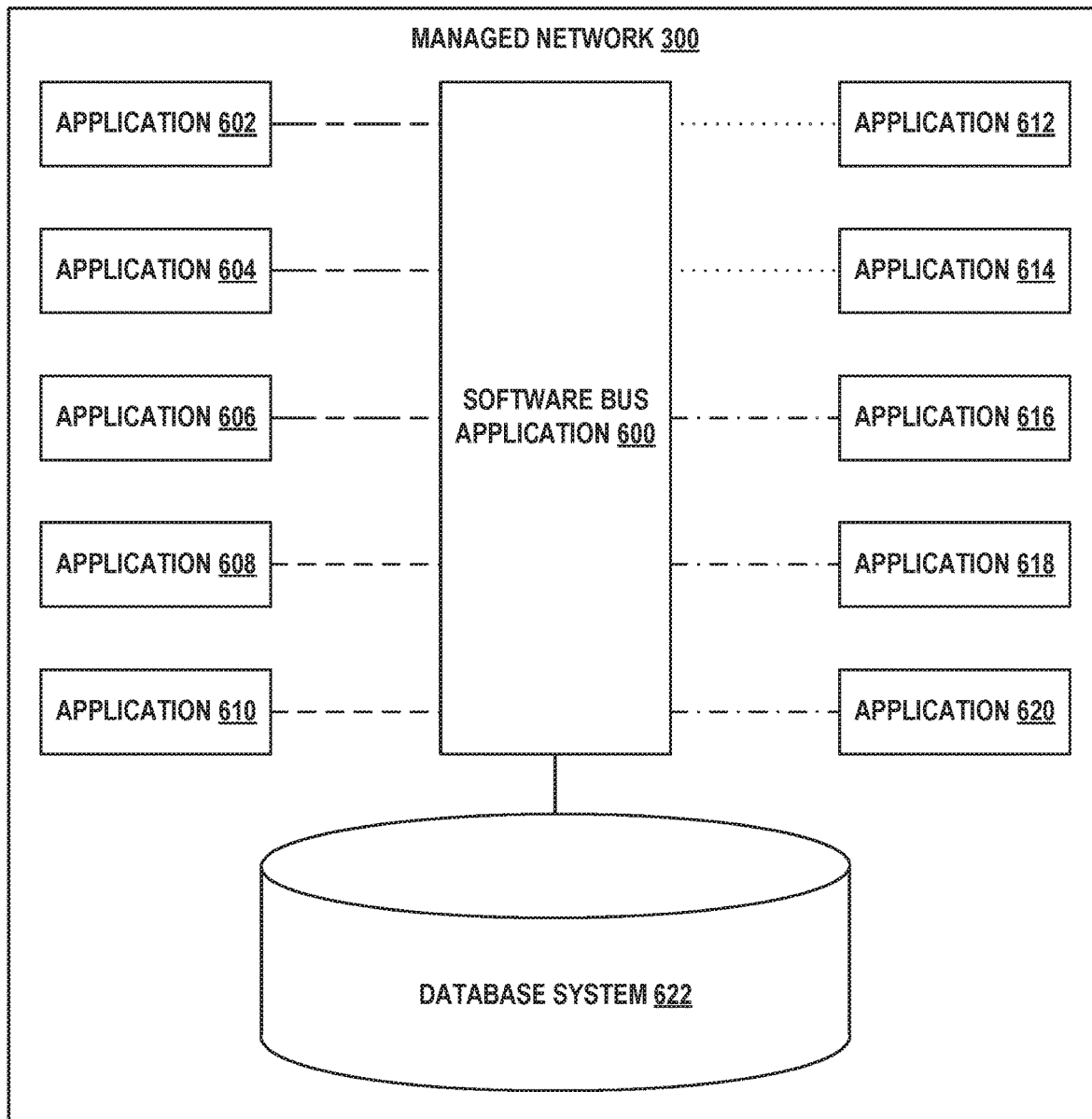
FIG. 6 depicts a software bus application, in accordance with example embodiments.
Figure 6:
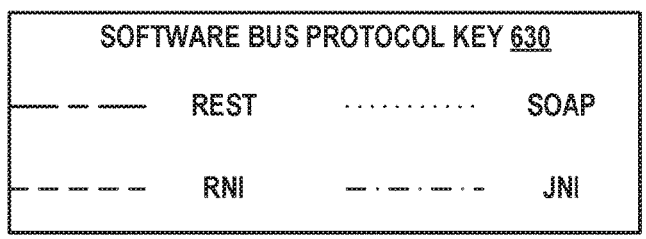

FIG. 6 illustrates an example arrangement of a software bus application within a managed network. Software bus application 600 may be disposed on a server device or other computing device within managed network 300. Software bus application 600 may be referred to as a software bus, for short, or an enterprise service bus (ESB). Software bus application 600 may communicatively connect a plurality of different software applications 602, 604, 606, 608, 610, 612, 614, 616, 618, and 620 (i.e., applications 602-620) within managed network 300. Applications 602-620 may be installed and configured to execute on one or more different computing devices within managed network 300.

Applications 602-620 may communicate using different combinations of messaging formats, communication protocols, and other standards, as indicated by the patterns of the respective lines connecting applications 602-620 to software bus application 600. Software bus protocol key 630 shows the format, protocol, or standard corresponding to each line pattern. Namely, applications 602, 604, and 606 are configured to communicate according to a representational state transfer (REST) standard. Applications 608 and 610 are configured to communicate according to a raw native interface (RNI) standard. Applications 612 and 614 are configured to communicate according to a simple object access protocol (SOAP). Finally, applications 616, 618, and 620 are configured to communicate according to a JAVA® native interface (JNI) standard. Applications may also be configured to communicate according to other formats, protocols, or standards not mentioned herein.

Software bus application 600 may, among other functions, facilitate communication and integration among applications that utilize different communication formats, protocols, or standards. For example, software bus application 600 may translate messages provided by application 602 into a format that application 620 is configured to interpret, parse, or otherwise understand. In general, software bus application 600 may be configured to route messages between applications 602-620 and to translate messages between the different formats, protocols, or standards shown in key 630, for example. Accordingly, the communication formats, protocols, and standards of each of applications 602-620 may be modified without also having to modify the remaining applications to take into account this change. Instead, this change may be accounted for by software bus application 600.

Software bus application 600 may provide a plurality of network ports for software applications 602-620 to use when connecting to software bus application 600. In one example, each of the plurality of ports may be associated with a corresponding message format, protocol, and/or other standards. Thus, for example, in order to communicate by way of software bus application 600, software application 610 is configured to address its communications to a network port assigned to the RNI standard. Each of applications 602-620 may be preconfigured with a list of the network ports on which software bus application 600 listens and the format, protocol, or standard associated with each port. Accordingly, software bus application 600 may determine the format, protocol, and/or standard used by a particular software application based on the port number to which the particular software application addresses its message. Alternatively, software bus application 600 may provide a plurality of universal network ports that can be used regardless of the format, protocol, or standard of a given software application. Each transmission may instead be decoded by software bus application 600 based on the contents thereof.

Notably, software bus application 600 may store (e.g., in a file) data that identifies each of software applications 602-620 and the attributes and parameters associated therewith. For example, this data may identify the services offered by a given software application and the communication format, protocol, and/or standard used thereby. The data may be generated and/or updated as each software application is first configured (e.g., by way of an initialization or setup procedure) to communicate by way of software bus application 600. The data for a given software application may be updated as the given software application communicates by way of software bus application 600. For example, when the given software application uses a network port assigned to a different communication format or protocol than it used previously, the data may be updated to reflect this change. Software bus application 600 may use this data to facilitate the communications between applications 602-620. Additionally, this data may be usable by the discovery pattern to discover applications 602-620 by way of software bus application 600 as part of one discovery process.

Figure 8:
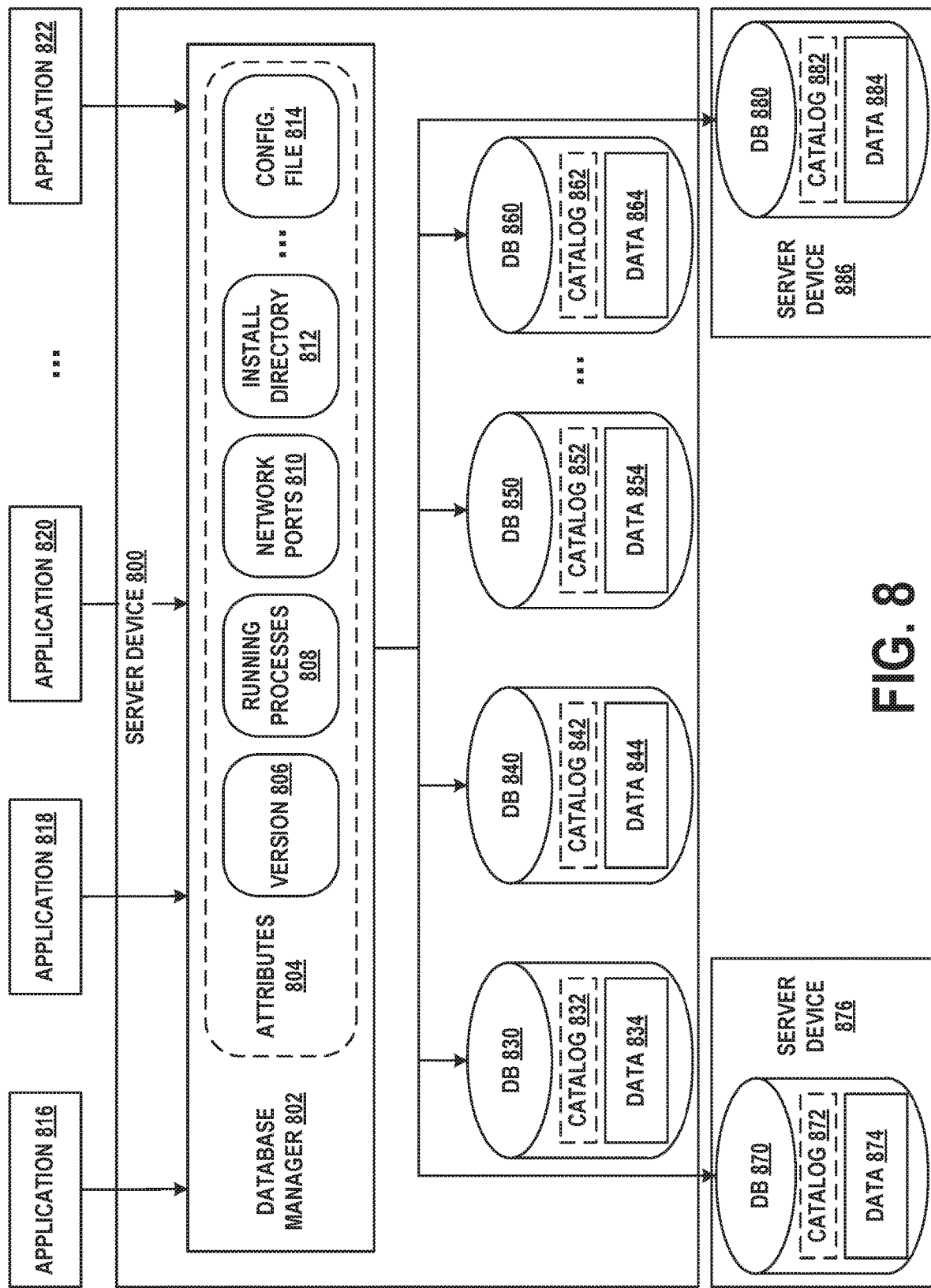
FIG. 8 depicts a database manager, in accordance with example embodiments.

Software bus application 600 may be connected to database system 622, which may provide persistent data storage for one or more of applications 602-620. Notably, database system 622 may represent one or more databases managed by a shared database manager. Applications 602-620 may access database system 622 by way of software bus application 600. That is, in order to communicate with database system 622, the data sent by each of applications 602-620 may first be transmitted to software bus application 600. Software bus application 600 may then forward this data on to databases system 622, reformatting the data as needed according to the message format, communication protocol, and/or other standards utilized by database system 622. However, in some cases applications 602-620 may also be able to access database system 622 directly. Notably, FIG. 8 illustrates an example architecture of database system 622, which will be discussed in more detail below.

Software bus application 600 may provide additional functionality such as, for example, message queuing, exception or error handling, and enforcement of quality of communication service, among other possibilities. One example of software bus application 600 is RED HAT® JBOSS® Fuse which provides a platform for integration of software applications, services, and microservices (e.g., containerized software applications). Software bus application 600, applications 602-620, database system 622, and the connections therebetween may be discovered and mapped by way of a discovery application. The discovery application may implement discovery patterns adapted for each of the configuration items sought to be discovered. For example, the discovery application may implement a discovery pattern configured to (i) identify that a software bus application is JBOSS® Fuse and (ii) execute a discovery procedure specific to JBOSS® Fuse to discover the structure, attributes, and parameters specific thereto.

Figure 7:
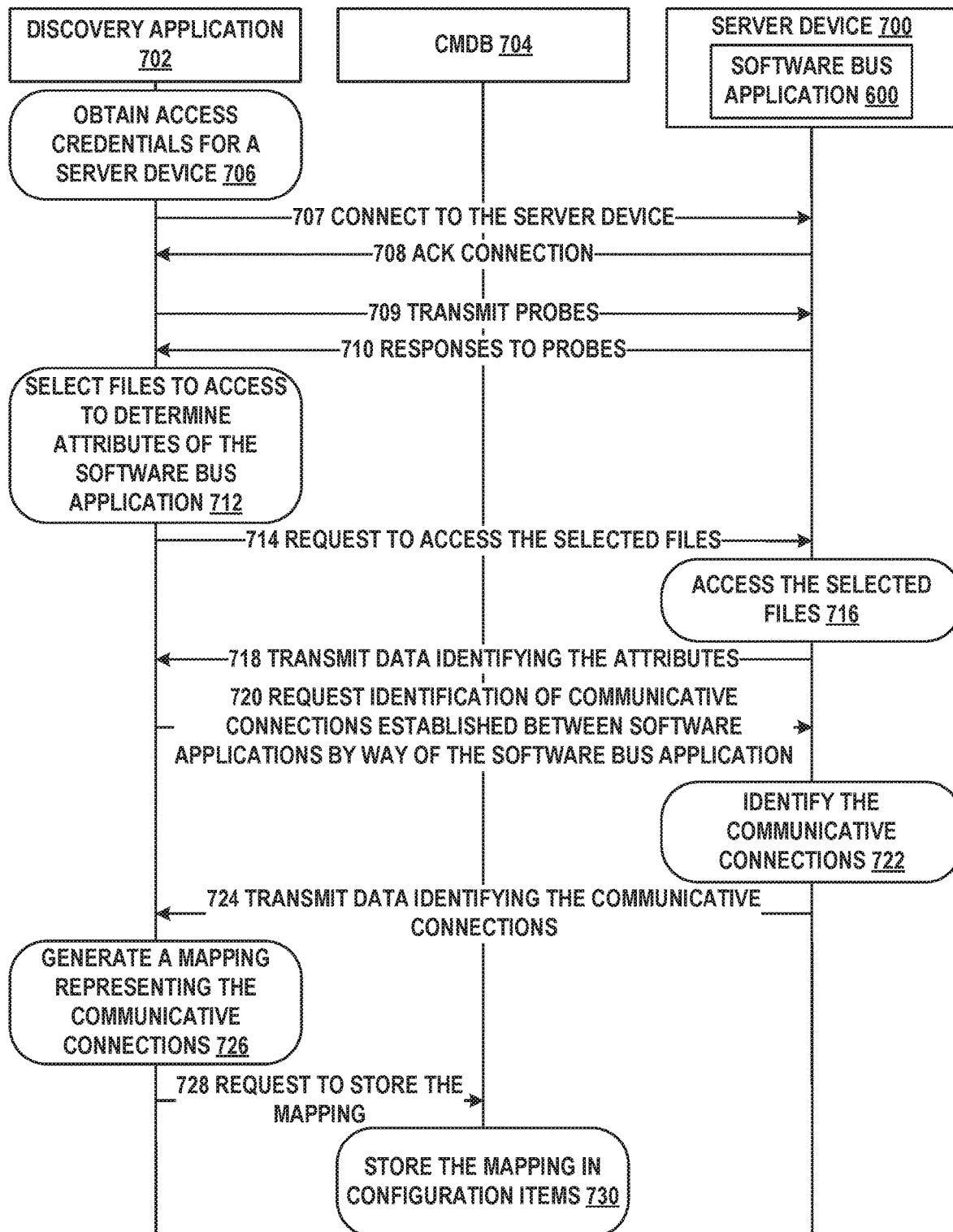
FIG. 7 depicts a message flow diagram, in accordance with example embodiments.

FIG. 7 illustrates an example message flow diagram that details the discovery process of software bus application 600 and software applications 602-620. Discovery of software bus application 600 and software applications 602-620 may be facilitated by discovery application 702. Discovery application 702 may be disposed within remote network management platform 320 (e.g., within computational instance 322) or within managed network 300 (e.g., on proxy servers 312). However, in some implementations, aspects of discovery application 702 may also be distributed between remote network management platform 320, managed network 300, and/or other computing devices.

Configuration management database (CMDB) 704 may be configured to store configuration items representing any entities discovered in, for example, managed network 300. Like discovery application 702, CMDB 704 may be disposed within remote network management platform 320, within managed network 300, or distributed therebetween. Software bus application 600 may be hosted or disposed on server device 700 which, in turn, may form part of managed network 300.

Discovery of software bus application 600 may be initiated by discovery application 702 obtaining or receiving access credentials for server 700, as indicated by block 706.

The credentials may be, for example, secure socket shell (SSH) credentials that discovery application 702 may use to remotely access server device 700 by way of an SSH connection. In response to or based on obtaining the credentials at block 706, discovery application 702 may transmit, to server device 700, a request to establish a connection therewith using the credentials obtained at block 706, as indicated by arrow 707. Server 700 may validate the credentials and, if valid credentials were provided, establish the requested connection. Server device 700 may be configured to confirm establishment of the connection by transmitting, to discovery application 702, and acknowledgement (ACK) of the established connection, as indicated by arrow 708.

In response to or based on establishing the connection, discovery application 702 may be configured to probe server device 700 according to one or more discovery patterns to identify software bus application 600, as indicated by arrow 709. The probing may involve, for example, transmitting, to server device 700, instructions configured to cause an operating system of server device 700 to identify software processes executing on server device 700 and/or scan various directories or files of server device 700 according to predetermined criteria. For example, discovery application 702 may initially detect software bus application 600 on server device 700 by searching a list of processes executing on server device 700 for processes whose names or parameters (e.g., working directory, command used to invoke the process, etc.) match those defined by the one or more discovery patterns. In another example, discovery application 702 may detect or gather additional information about software bus application 600 by scanning for directories or files whose names match or are similar to names defined within the one or more discovery patterns (e.g., directories whose names include "jboss" or "fuse," in the case of JBOSS® Fuse). In response to or based on the probes, server device 700 may be configured to transmit, to discover application 702, corresponding responses to the probes, as indicated by arrow 710.

Based on or in response to such probing, discovery application may be configured to select one or more files to access within directories associated with software bus application 600, as indicated by block 712. The files and the directories may be selected based on one or more discovery patterns specific to software bus application 600, which define operations, rules, and patterns for discovering software bus application 600 (rather than other applications). Notably, different discovery patterns may be used to discover software bus application 600 depending on the provider (e.g., RED HAT® vs ORACLE®), name (JBOSS® Fuse vs MULESOFT® ESB), or version (e.g., release version 1.5 vs release version 2.0) of software bus application 600 being discovered.

The one or more directories may be selected, for example, from a list of directories discovered on server device 700 by the probes at arrow 709. In another example, the one or more directories may be selected bases on one or more software processes executing on sever device 700. Namely, the probes at arrow 709 may be configured to cause server device 700 to identify one or more software processes executing thereon and corresponding to software bus application 600. Each respective software process may be associated with corresponding attributes, which server device 700 may similarly be caused to identify. For example, the attributes for a respective software process may include a process identifier, a command used to invoke execution of the respective software process, a working directory associated with the respective software process, and/or files opened by the respective software process (along with their respective file system paths), among other possibilities. Discovery application 702 may be configured to select the one or more directories based on these attributes. For example, the one or more directories may include (i) the working directory of the respective process and (ii) any directories containing files opened by the respective process.

Accordingly, in one example, the one or more directories may include a directory in which software bus application 600 is installed and thus stores a portion of its files (e.g., a parent directory of the working directory). The one or more directories may also include a configuration directory (e.g., within the install directory) in which software bus application 600 stores various configuration files or other descriptive files (e.g., README files) that contain information regarding installation, configuration, and operation of software bus application 600. The one or more directories may further involve system directories (e.g., /etc on LINUX® devices) shared by multiple different software applications in which the operating system stores various definitions, attributes, and parameters associated with software bus application 600. For example, the "/etc" directory may contain a "services" file that defines network port numbers (e.g., TCP or UDP) that various services or applications configured for execution on server device 700 use to listen for incoming network traffic.

The one or more files selected to be accessed may include any files that store or are expected to store information necessary for discovering software bus application 600 and its connections with applications both inside and outside of managed network 300. For example, README or configuration files may provide information regarding the name of software bus application 600, the provider or vendor of software bus application 600, the release version of software bus application 600, and/or any plug-ins or add-ons used by software bus application 600, among other information. The "services" file in the "/etc" directory may allow discovery application 702 to determine network ports on which software bus application 600 listens for connections from applications 602-620, database system 622, and/or other entities with which software bus application 600 interacts. For example, the services file (or another similar file) may define network ports on which software bus application 600 listens for communications from applications 602-620 and, for each of these network ports, the corresponding format, protocol, or standard (e.g., from software bus protocol key 630) assigned thereto.

The one or more selected files may also identify software applications 602-620 that are configured to communicate by way of software bus application 600. For example, the one or more files may define, for each of software applications 602-620, the communication format, protocol, and/or standard used thereby as well as any other identifiers, parameters, or attributes associated therewith. Thus, by accessing the information in such files, software applications 602-620 may be discovered by way of software bus application 600. Notably, software applications 602-620 may be discovered without employing a separate discovery pattern for each of software applications 602-620 (although such separate patterns may nevertheless be used to supplement the information discovered by way of software bus application 600).

The specific directories and files that contain information involved in discovery of software bus application 600 and applications 602-620 may vary between different implementations of software bus application 600. Accordingly, different discovery patterns may be developed to specify what files to access and where these files are located for a given implementation of software bus application 600.

In response to or based on selecting the files to access at block 712, discovery application 702 may be configured to transmit, to server device 700, a request to access the selected files, as indicated by arrow 714. This request may indicate specific information to be retrieved from the one or more files (e.g., portions of the file indicative of a type, name, provider, or version of software bus application 600). In response to or based on the request at arrow 714, server device 700 may be configured to access the selected files to determine attributes of software bus application 600, as indicated by block 716. Specifically, server device 700 may access the selected files and extract or collect therefrom attributes identified by the discovery pattern. Server device 700 may access the files directly, by opening and reading their contents, or indirectly, by using one or more application programming interfaces (APIs) provided by software bus application 600, for example. Notably, in some implementations, a portion of the information useful in determining the attributes identified by the discovery pattern may be stored in other ways such as, for example, in one or more databases. Nevertheless, this information may be accessible by way of the APIs or other means provided by software bus application 600.

In response to or based on accessing the selected files and gathering the attributes of software bus application 600, server device 700 may be configured to transmit, to discovery application 702, data identifying the plurality of attributes, as indicated by arrow 718. As discussed above, the attributes may include a provider, name, or version of software bus application 600, network ports used by software bus application 600 to listen for incoming connections, and/or identifiers of software applications 602-620, among other possibilities. In response to or based on receiving the data at arrow 718, discovery application 702 may be configured to transmit, to server device 700, a request to identify communicative connections established between or among software applications 602-620 by way of software bus application 600, as indicated by arrow 720.

The content and/or format of the request at arrow 720 may be based on the plurality of attributes provided to discovery application 702 at arrow 718. Discovery application 702 may request that server device 700 and/or software bus application 600 monitor and log any messages and/or network traffic exchanged between or among application 602-620 by way of software bus application 600. In response to or based on the request at arrow 720, server device and/or software bus application 600 may be configured to generate and store data representing communicative connections established between or among applications 602-620 by way of software bus application 600, as indicated by block 722.

Communication among applications 602-620 may involve at least two steps. In one example, application 602 may be communicating with application 618. Application 602 first transmits to software bus application 600 a first request to initiate a communicative connection therewith (e.g., a TCP SYN packet). The first request may be addressed to an IP address (e.g., 192.0.0.1) associated with server device 700 and a network port number (e.g., TCP port 81) (i) associated with software bus application 600 and (ii) corresponding to the communication format, protocol, or standard used by application 602. The first request may originate from an IP address (e.g., 192.0.0.2) associated with a computing device on which application 602 is disposed and a network port assigned to application 602 (e.g., 2041). Once accepted, the first request forms a first communication socket (i.e., 192.0.0.2:2041, 192.0.0.1:81), indicating the two endpoints, source and destination, respectively, of the connection.

Application 602 may use this socket to communicate with software bus application 600, sending messages or packets containing instructions or data intended for application 618. Software bus application 600 may be configured to (i) identify application 602 as the source of this communication and/or (ii) identify application 618 as the destination or intended recipient of this communication. Software bus application 600 may also be configured to modify the messages as needed in order to translate between the format, protocol, and/or standard utilized by application 602 to the format, protocol, and/or standard utilized by application 618.

Notably, when each listening port of software bus application 600 is assigned for communicating with a corresponding application of applications 602-620, the source of the communication may be identifiable without parsing the message received from the corresponding application. Additionally, in some implementations, application 602 may be aware that one of application 604-620 is configured to provide a service sought by application 602, but might not be aware of the identify of this application. Thus, application 602 may specify the desired service while software bus application 600 may be configured to select the application (e.g., 618) configured to provide this service and transmit an appropriately-translated message thereto.

After receiving and translating the message from application 602, software bus application 600 may then transmit to software application 618 a second request to initiate a communicative connection therewith. The second request may be addressed to an IP address (e.g., 192.0.0.3) associated with a computing device on which application 618 is disposed and a network port number (e.g., TCP port 8081) associated with software application 618. The second request may originate from the IP address (e.g., 192.0.0.1) associated with server device 700 and a network port assigned thereto (e.g., 4082). Once accepted, the second request forms a second communication socket (i.e., 192.0.0.1:4082, 192.0.0.3:8081).

Software bus application 600 may use this socket to send to application 618 the modified message originating from application 602. Additionally, application 618 may use the second socket to send a response back to software bus application 600. Software bus application 600 may modify this response as needed in view of the differences between the formats, protocols, and standards used by applications 602 and 618 and transmit the modified response to application 602 by way of the first socket.

Accordingly, the data (representing communicative connections between applications 602-620) generated by server device 700 and/or software bus application 600 may include, for example, the source application (e.g., application 602 identified by its alphanumeric name), format, protocol, and/or standard used by the source application, destination application (e.g., application 618 identified by its alphanumeric name), format, protocol, and/or standard used by the destination application, and transmission time (e.g., start and end times) of messages exchanged among applications 602-620 by way of software bus application 600. The strength or intensity of a communicative relationship between two applications may be estimated by the number of messages exchanged therebetween over a unit of time (e.g., one minute, one hour, one day, etc.) and/or a size of such messages. In some cases, the attributes collected at block 716 may be used to instruct server device 700 and/or software bus application 600 to monitor and log particular types of messages (e.g., messages indicating initiation of a connection between two applications) or information. In some implementations, software bus application 600 may provide an API or similar mechanism that provides a way to control the type of information collected by software bus application 600 and a way to access the collected data.

Notably, although any one of applications 602-620 may be configured to communicate with any other one of applications 602-620 due to the translation provided by software bus application 600, only some combinations of these applications may actually establish active communicative connections. Because communications among applications 602-620 are made by way of software bus application 600, it may be difficult to discover communicative relationships among applications 602-620 without using software bus application 600. When, for example, a first application requests a service by way of software bus application 600 without specifying a second application that will provide the service, the requested service may appear, from the perspective of the first application, to be provided by software bus application 600. That is, the first application might not be able to determine the identity of the second application.

Thus, a discovery pattern that discovers each of software applications 602-620 independently, rather than through software bus application 600, might not be able to determine which software applications actually communicate with one another. Discovering software applications 602-620 by using data and functionality provided by software bus application 600 thus allows for discovery of such communicative connections. Accordingly, the data generated at block 722 may disambiguate pairs of software applications that could potentially communicate from pairs of applications that have successfully communicated in the past.

Based on or in response to identifying the communicative connections at block 722, server device 700 may be configured to transmit, to discovery application 702, data identifying the communicative connections, as indicated by arrow 724. Based on or in response to receiving the data at arrow 724, discovery application 702 may be configured to generate a mapping representing the communicative connections, as indicated by block 726. The mapping may include, for example, nodes representing software bus application 600 and each of applications 602-620. The mapping may also include connections between theses nodes that represent the communicative connections. Accordingly, the mapping may be configured to be visually rendered to represent the arrangement and relationships among software bus application 600 and applications 602-620. For example, each of applications 602-620 may be shown as connected to one or more other applications by a line having a corresponding color and/or pattern that makes the relationship visually discernable.

Additionally, the mapping may indicate the respective computing devices on which each of the software application and databases are disposed. For example, the mapping may indicate that software bus application 600 is hosted by server device 700 by, for example, indicating the node of software bus application 600 as a sub-node within a larger node representing server device 700. Similarly, when one or more of software applications 602-620 are distributed among one or more additional server devices, this distribution may be illustrated in a similar manner. Further, the mapping may indicate one or more of the attributes received at arrow 718, such as, for example, the name, version, and/or provider (e.g., collectively representing the type) of software bus application 600.

Based on or in response to generating the mapping at block 726, discovery application 702 may be configured to transmit, to CMDB 704, a request to store the generated mapping in CMDB 704, as indicated by arrow 728. In response to or based on the request at arrow 728, CMDB 704 may be configured to store the mapping as one or more configuration items, as indicated by block 730. The stored configuration items may be retrieved by one or more client devices to generate a visual representation of software bus application 600 and its relationships with server device 700, and applications 602-620, among others.

Additionally, discovery application 702 may be configured to transmit, to server device 700, a further request to identify additional communicative connections between software bus application 600 and database system 622. This request may be generated and transmitted in response to or based on storing the mapping at block 730, or in response to or based on receiving the data at arrow 718, for example.

The content of the further request may be based on the plurality of attributes provided to discovery application 702 at arrow 718. Namely, discovery application 702 may request that server device 700 and/or software bus application 600 monitor and log any network traffic exchanged between database system 622 and any of application 602-620 by way of software bus application 600. In response to or based on the further request, server device 700 and/or software bus application 600 may be configured to generate and store data representing additional communicative connections between software bus application 600, applications 602-620, and database system 622, among others.

Software applications 602-620 may communicate with database system 622 (by way of software bus application 600) in a manner similar to that described above with respect to communication between two different applications. Namely, in the case of application 604 communicating with database system 622 by way of software bus application 600, a first communication socket may be established between application 604 and software bus application 600 in response to a request from application 604. Application 604 may use this socket to transmit any data or instructions intended for database system 622 by way of software bus application 600. A second communication socket may be established between software bus application 600 and database system 622 in response to a request from software bus application 600. Software bus application 600 may use this socket to transmit, to database system 622, the data or instructions originating from application 604. Notably, software bus application 600 may modify the data and/or instructions according to any differences between the format, protocol, and/or standards used by application 604 and database system 622.

Software bus application 600 may also use the second socket to receive, from database system 622, any communications responsive to the data and/or instructions. Again, these responsive communications may be modified as needed in view of any differences between the format, protocol, and/or standards used by application 604 and database system 622 and transmitted by software bus application 600 to application 604 by way of the first socket. Thus, software application 604 may, for example, store data in one or more databases of database system 622, regardless of the format, protocol, and/or standards used by the one or more databases.

The data logged by server device 700 and/or software bus application 600 may indicate the source application (e.g., application 604) and database system 622 as the destination of the communication. For example, the data may identify the source application based on the first socket or aspects thereof (e.g., a particular application might be assigned a specific listening port of software bus application 600) and database system 622 based on the second socket or aspects thereof (e.g., database system 622 may be associated with a particular IP address and one or more port numbers on which database system 622 listens for incoming connections). In order to generate such data, software bus application 600 may be configured to map network traffic received from a software application by way of the first socket to network traffic transmitted to database system 622 by way of the second socket. Thus, network traffic generated by software bus application 600 on behalf of the software application may be mapped back to or otherwise associated with the software application that originated the communication. Additionally, software bus application 600 and/or server device 700 may be configured to track the times at which network packets or messages are transmitted and/or received via the first and second sockets. The logged data may be accessible, for example, by way of an API, command-line interface, or similar mechanism provided by software bus application 600.

The attributes collected at block 716 may be used by server device 700, software bus application 600, and/or discovery application 702 to filter the monitored network traffic. For example, network packets that do not originate from and/or are not addressed to software bus application 600, applications 602-620, and/or database system 622 might not be tracked or logged. Alternatively or additionally, only network packets associated with a subset of applications 602-620 might be tracked. The strength or intensity of a communicative relationship between an application and database system 622 (or one or more databases thereof) may be estimated by the number of network packets (e.g., of a particular type) exchanged therebetween over a unit of time (e.g., one minute, one hour, one day, etc.) and/or the size of these packets.

Notably, the IP address corresponding to the server device on which database system 622 is located and the port number assigned to database system 622 may be determined using separate discovery patterns, as will be discussed with respect to FIGS. 8 and 9. In some implementations, this information may be discovered concurrently, by executing both discovery patterns in parallel. Alternatively, aspects of database system 622 may be discovered at an earlier time, and may be stored in configuration items in a CMDB that discovery application 702 may access. In either case, discovery application 702 may provide the IP address and port number associated with database system 622 to server device 700, thereby allowing server device 700 to identify the additional communicative connections by monitoring network traffic between database system 622 and software bus application 600.

Based on or in response to identifying the additional communicative connections, server device 700 may be configured to transmit, to discovery application 702, data identifying the additional communicative connections. Based on or in response to receiving the data, discovery application 702 may be configured to generate an additional mapping representing the additional communicative connections. The additional mapping may include, for example, a node representing database system 622 and connections between this node and the nodes determined at block 726, thereby representing the additional communicative connections. Namely, the additional mapping may represent communicative connections between database system 622 and software applications 602-620.

The additional mapping and the mapping determined at block 726 may be visually rendered to represent the arrangement and relationships among software bus application 600, applications 602-620, and database system 622. In some cases, the additional mapping may be expressed as a modification to the mapping generated at block 726, rather than as a separate mapping.

Based on or in response to generating the additional mapping, discovery application 702 may be configured to transmit, to CMDB 704, a request to store the additional mapping in CMDB 704. In response to or based on this request, CMDB 704 may be configured to store the additional mapping in one or more additional configuration items. The stored configuration items may be retrieved by one or more client devices to generate a visual representation of software bus application 600 and its relationships with server device 700, applications 602-620, and database system 622, among others.

Notably, as will be described in more detail below, combining the discovery process shown in FIG. 7 with a discovery process for database system 622, as shown in and described with respect to FIGS. 8 and 9, may allow for generation of a further mapping that reflects how individual databases that make up database system 622 relate to software bus application 600 and applications 602-620.

VII. Example Discovery of a Database Manager

FIG. 8 illustrates an example implementation of a database system such as, for example, IBM® INFORMIX®. The database system may represent, for example, database system 622 illustrated in and discussed with respect to FIGS. 6 and 7. The database system may include database manager 802 and a plurality of secondary databases 830, 840, 850, 860, 870, and 880 (i.e., hereinafter referred to as databases 830-880). In one example, databases 830-880 may represent different physical databases that are represented as one logical database by database manager 802.

Notably, databases 830-880 are herein referred to as "secondary" to distinguish them from CMDB 704 and CMDB 902. Databases 830-880 may be used to store data on behalf of applications 602-620, while CMDB 704 and CMDB 902 are used to store configuration items for managed network 300. Additionally, databases 830-880 may form part of managed network 300 while CMDB 704 and CMDB 902 may be disposed in remote network management platform 320. However, although secondary databases 830-880, CMDB 704, and CMDB 902 may store different types of data and may be part of different computing systems, each of these databases may be implemented using similar technologies, techniques, and/or standards (e.g., SQL).

Database manager 802 may be disposed on server device 800, which, in turn, may form part of managed network 300. In some implementations, however, database manager 802 may be disposed on server device 700 such that it is co-located with software bus application 600 (i.e., server device 800 and server device 700 may represent to the same computing device). Secondary databases 830, 840, 850, and 860 may be disposed on server device 800, while secondary databases 870 and 880 may be disposed on server devices 876 and 886, respectively. The database system might thus be distributed among multiple computing devices.

The database system may be communicatively connected to software applications 816, 818, 820, and 822 (i.e., applications 816-822). Applications 816-822 may access corresponding secondary databases 830-880 by way of database manager 802. Database manager 802 may thus operate to manage interactions between software applications seeking to use secondary databases 830-880 of the database system. Notably, databases 830-880 may be accessible by way of one or more network ports on which database manager 802 listens for incoming connections. In some implementations, applications 816-820 may be connected to each other and/or to database manager 802 by way of a software bus application, as shown and discussed with respect to FIG. 6. Applications 816-822 may thus be analogous to applications 602-620.

Database manager 802 may be associated with a plurality of attributes 804 that provide additional descriptive details regarding database manager 802. Attributes 804 may be used to disambiguate database manager 802 from other database management systems. Attributes 804 may include, for example, an indication of version 806 of database manager 802 being executed on server device 800, processes 808 associated with database manager 802 that are running on server device 800, network ports 810 used by database manager 802, install directory 812 in which database manager 802 is installed, and one or more configuration files 814 that define various parameters according to which database manager 802 is configured to operate, among other attributes.

Each of secondary databases 830-880 may contain therein data stored on behalf of one or more software applications (e.g., applications 816, 818, 820, and 822) and may be associated with a corresponding database catalog. Namely, secondary database 830 contains data 834 and is associated with catalog 832, secondary database 840 contains data 844 and is associated with catalog 842, secondary database 850 contains data 854 and is associated with catalog 852, secondary database 860 contains data 864 and is associated with catalog 862, secondary database 870 contains data 874 and is associated with catalog 872, and secondary database 880 contains data 884 and is associated with catalog 882. Notably, the catalogs may be stored in their corresponding databases or as part of database manager 802 (e.g., a part of a master database thereof).

Each database catalog may contain metadata that defines or describes the components of the corresponding database and the attributes of those components. For example, catalog 842 may define the tables in database 840, the rows and columns that make up database 840, the relationships between the different tables within database 840, the data types associated with the columns, the model utilized by database 840 to store data 844 (e.g., relational model or object-relational model), and database views (i.e., stored database queries that return a subset of the data, sometimes referred to as virtual tables), among other possibilities. Thus, a database catalog may define a structure of a corresponding database. The catalogs may also track database sessions and activity. For example, catalog 882 may indicate the times at which database 880 was accessed and the operations or transactions carried out at such times. Notably, as described in more detail below, the information stored in the catalogs may be combined with the communicative connections tracked by software bus application 600 and/or server device 700 to determine how databases 830-880 relate to applications 602-620.

Figure 9:
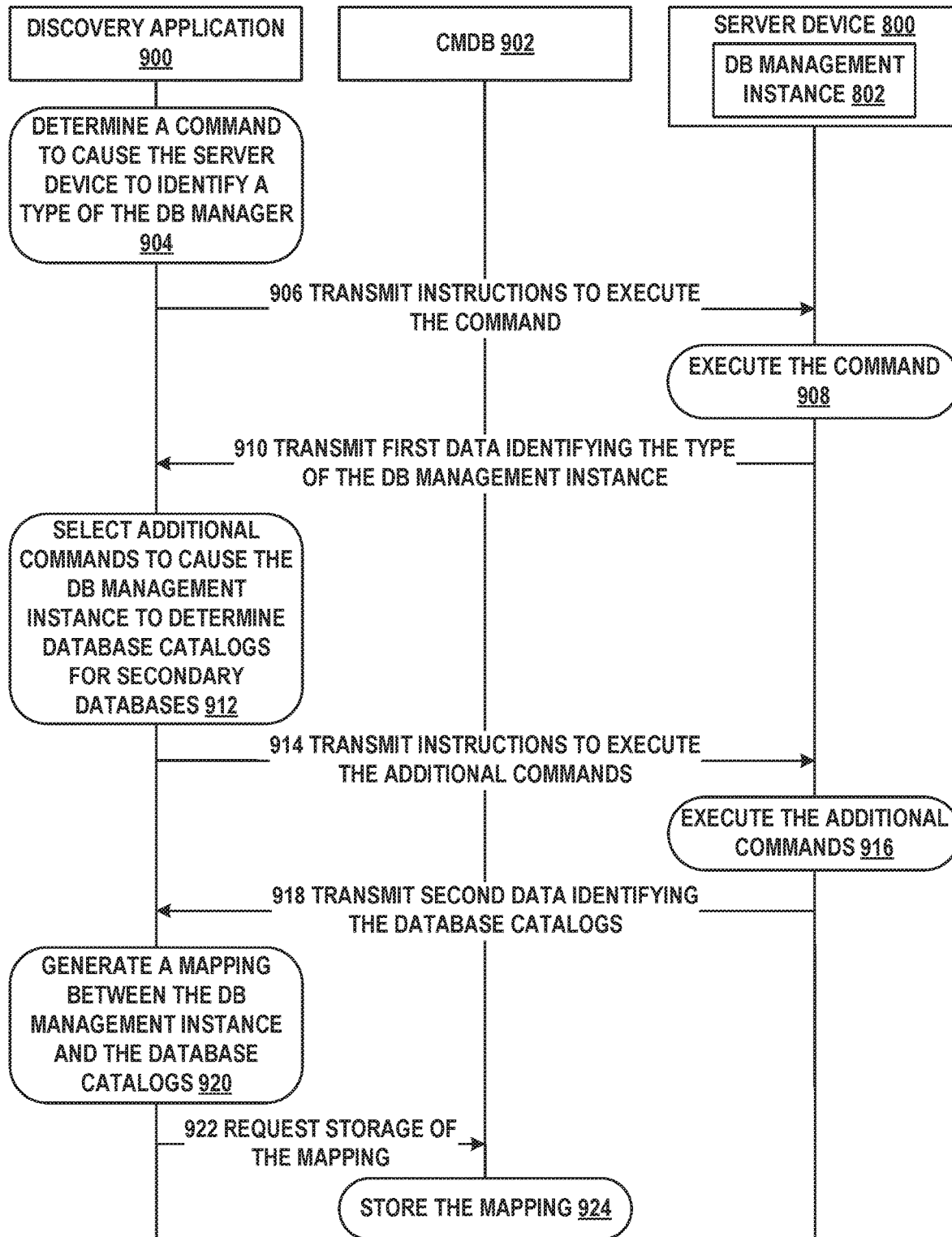
FIG. 9 depicts a message flow diagram, in accordance with example embodiments.

FIG. 9 illustrates an example message flow diagram that details the discovery process of the database system shown in FIG. 8, including database manager 802 and secondary databases 830-880. The discovery process may be facilitated by discovery application 900. In some cases, discovery application 900 may be the same as discovery application 702, but may utilize a different discovery pattern to discover the database system. Alternatively, the two discovery applications may be different, each implementing a different discovery process specific to the configuration item sought to be discovered. Nevertheless, much like discovery application 702, discovery application 900 may be disposed within remote network management platform 320, disposed within managed network 300, or distributed therebetween.

Similarly, CMDB 902 and CMDB 704 may refer to the same database. Alternatively, CMDB 902 and CMDB 704 may represent different databases each configured to store particular types of configuration items (e.g. configuration items representing applications vs configuration items representing databases). CMDB 902 may be disposed in remote network management platform 320. However, in some implementations, CMDB 902 may alternatively be disposed in managed network 300 or distributed among managed network 300, remote network management platform 320, and/or other computing devices. Likewise, server device 800 and server device 700 may represent the same or different server device, depending on the implementation.

Discovery of database manager 802 may involve discovery application 900 determining a command configured to cause server device 800 to identify a type of database manager 802, as indicated by block 904. The type of database manager 802 may include or be defined by a name (e.g., INFORMIX®) of database manager 802, a vendor or provider (e.g., IBM®) of database manager 802, and/or a version (e.g., release 12.0) of database manager 802, among other possibilities. Discovery application 900 may determine the command based on the results of one or more probes transmitted to server device 800. As discussed with respect to FIG. 7, the probes may contain instructions to identify executing processes, scan various directories, and/or scan various files on server device 800. Notably, however, in this case, the probes may be configured to scan for processes, directories, and files associated with various types of database managers, rather than software buses. Accordingly, in response to one or more probes detecting database manager 802, the command may be selected to obtain additional information regarding database manager 802.

Based on or in response to selecting the command at block 904, discovery application 900 may be configured to transmit, to server device 800, instructions to execute the command, as indicated by arrow 906. As in the case of software bus application 600, the instructions may be transmitted by way of an SSH connection established based on or in response to obtaining valid credentials for connecting to server device 800.

Based on or in response to reception of the instructions at arrow 906, server device 800 may be configured to execute the command, as indicated by block 908. The command may involve instructions configured to cause server device 800 to access one or more files, obtain attributes of one or more executing processes, and/or query an API provided by database manager 802 to obtain data indicating the type of database manager 802. In the case of the IBM® INFORMIX® database system, for example, the command "onstat -g dis" may be executed by server device 800 in an operating system command shell to determine the type of database manager 802 based on, for example, attributes 804 of database manager 802. Notably, the specific process carried out by server device 800 may depend on the results of the probes transmitted to server device 800 and the discovery patterns used in an attempt to obtain the data indicating version 806.

Based on or in response to executing the command at block 908, server device 800 may be configured to transmit, to discovery application 900, first data identifying the type of database manager 802, as indicated by arrow 910. Based on or in response to receiving the first data at arrow 910, discovery application 900 may be configured to select one or more additional commands configured to cause database manager 802 to determine, for each of secondary databases 830-880, a respective catalog, as indicated by block 912. Discovery application 900 may be configured to select the one or more additional commands based on a discovery pattern corresponding to the type of database manager 802 as identified by the first data. That is, the one or more additional commands may be specific to the type (e.g., version, name, and/or provider) of database manager 802.

Based on or in response to selecting the one or more additional commands at block 912, discovery application 900 may be configured to transmit, to server device 800, instructions to execute the one or more additional commands. Based on or in response to receiving the one or more additional commands at arrow 914, database manager 802 may be configured to execute the one or more additional commands, thereby generating second data indicating the respective catalog for each of databases 830-880. In the case of the IBM® INFORMIX® database system, for example, the second command may be "dbaccess sysmaster," which may cause database manager 802 to access an internal "master" database in database manager 802 that contains the respective catalogs of databases 830-880. In other cases, the one or more additional commands may cause database manager 802 to retrieve the respective catalogs stored in each of databases 830-880.

Based on or in response to execution of the one or more additional commands at block 916, server device 800 may be configured to transmit, to discovery application 900, second data identifying database catalogs 832, 842, 852, 862, 872, and 882, as indicated by arrow 918. In some implementations, the second data may identify the catalogs (i.e., indicate which catalogs exist) as well as represent the contents thereof. That is, the second data may identify databases 830-880 and indicate how each of these databases is structured or organized, what each database contains, and how/when each database has been accessed or updated.

Accordingly, each of databases 830-880 may thus be discovered using a single discovery process by leveraging database manager 802 and the information stored and/or accessible thereby. That is, discovery application 900 might not have to implement or execute a separate, independent discovery process for each of databases 830-880, much like discovery application 702 might not have to implement a separate discovery process for each of applications 602-620.

Based on or in response to receiving the second data at arrow 918, discovery application 900 may be configured to generate a mapping between database manager 802 and the database catalogs, as indicated by block 920. The mapping may thus indicate databases 830-880 that are managed by database manager 802, as well as the structure of each of these databases. Based on or in response to generating the mapping at block 920, discovery application 900 may be configured to transmit, to CMDB 902, a request to store the mapping in CMDB 902 in one or more configuration items, as indicated by arrow 922. Based on or in response to the request at arrow 922, CMDB 902 may be configured to store therein the mapping in the one or more configuration items for later retrieval, as indicated by block 924.

Thus, after discovery, the database system (i.e., database manager 802 and secondary databases 830-880) and the structure thereof may be visualized by computing devices within, for example, managed network 300 based on the stored configuration items.

With the structure of the database system represented in CMDB 902, the relationships between the database system and other applications and devices within managed network 300 may be visualized as well. Namely, when the database system is utilized by one or more applications connected by way of a software bus application, as discussed with respect to FIG. 7, the database manager 802 may be mapped to software bus application 600. The relationship between database manager 802 and software bus application 600 may be identified based on communicative connections detected therebetween (e.g., as discussed above with respect to FIG. 7).

This mapping between software bus application 600 and database manager 802 may generally indicate that applications 602-620 may utilize databases 830-880. Notably, as discussed above, the discovery pattern for software bus application 600 may discover that a particular software application communicates with database manager 802 by way of software bus application 600. However, this discovery pattern, when used independently, might not be able to identify the specific secondary database used by the particular application. On the contrary, when the discovery patterns for each of software bus application 600 and database manager 802 are used in combination, the discovery application may determine how applications 602-620 utilize databases 830-880.

Namely, the network traffic monitored by server device 700 and/or software bus application 600 may be combined with the information contained in database catalogs 832, 842, 852, 862, 872, and 882 to identify the databases used by a particular application. The data representing the monitored network traffic may indicate, for each network packet, the times at which the network packet was transmitted or received at different points along the transmission path. For example, the data may indicate (i) a first time at which a particular network packet was received by software bus application 600 from a source software application (e.g., one of software applications 602-620) and/or (ii) a second time at which the particular network packet (which may be modified by software bus application 600) was transmitted from software bus application 600 to database manager 802. Additionally, in implementations where network traffic is also monitored by server device 800 and/or database manager 802, the data representing the monitored network traffic may also indicate (iii) a third time at which the particular network packet was received from software bus application 600 by database manager 802 and/or (iv) a fourth time at which a further network packet responsive to the communication from the source application was transmitted to software bus application 600. Further, the data may indicate (v) a fifth time at which the further network packet was received by software bus application 600 from database manager 802 and/or (vi) a sixth time at which the further network packet (which may be modified by software bus application 600) was transmitted from software bus application 600 to the source software application. Other times may be tracked as well.

Similarly, the database catalog of a particular secondary database may indicate the times at which the particular secondary database was accessed or modified. Accordingly, the first through sixth times associated with the network packets may be correlated with a time of a corresponding transaction, as represented by the database catalog, with the particular secondary database. For example, a first network packet may be correlated with one or more database transactions occurring within a threshold time interval after the first, second, and/or third times and/or before the fourth, fifth, and/or sixth times. Since each network packet is associated with a particular software application (and this association is monitored by software bus application 600), as discussed with respect to FIG. 7, the particular software application may be mapped to the particular secondary database, indicating a communicative relationship therebetween.

In one example, secondary database 840 may be used by application 604 to store data. Application 604 may communicate with database 840 by way of software bus application 600 and database manager 802. For example, application 604 may generate a request to store particular data in database 840. Application 604 may establish a first communicative connection with software bus application 600, forming a first socket, and may transmit the request to software bus application 600 in one or more network packets by way of the first socket. Software bus application 600 may log the time at which the one or more network packets are received thereby and the identity of software application 604 from which the network packets are received. Software bus application 600 may then modify the request and/or the one or more network packets according to any differences between the format, protocol, and/or standards used by application 604 and database manager 802.

Software bus application 600 may establish a second communicative connection with database manager 802, forming a second socket, and may transmit the modified request in one or more modified network packets to database manager 802 by way of the second socket. Software bus application 600 may log the time at which the one or more modified network packets are transmitted to database manager 802.

In response to receiving the one or more modified network packets, database manager 802 may be configured to comply with the request contained therein and store the particular data in database 840 (provided sufficient storage space is available). The storage transaction of the particular data may be reflected in catalog 842. Catalog 842 may also indicate the time at which the particular data was stored in database 840 (i.e., the transaction time). Thus, a communicative relationship may be identified between application 604 and database 840 based on (i) the times at which network packets are transmitted by software bus application 600 on behalf of software application 604 and (ii) the transaction times indicated by database catalog 842. Notably, this communicative relationship may be identified even when communications between database manager 802 and database 840 are difficult to detect (e.g., the communications involve inter-process communication) or are undetectable (e.g., one process handles the described operations of the database system).

Database manager 802 may transmit, to software bus application 600 and by way of the second socket, confirmation of successful storage of the particular data. Similarly, software bus application 600 may modify this confirmation and transmit it to software application 604 by way of the first socket. The first and second sockets may be subsequently closed.

Application 604 may thus be mapped to database 840. Notably, by combining (i) the traffic data monitored by software bus application 600 with (ii) the information stored in the catalogs associated with databases 830-880, application 604 may be mapped to database 840 even though application 604 communicates with database 840 by way of software bus application 600 and database manager 802 (rather than communicating with database 840 directly). Thus, by using the information obtained by both discovery patterns in parallel or combination, applications 602-620, which are "hidden" behind software bus application 600, and secondary databases 830-880, which are "hidden" behind database manager 802, may be mapped to each other directly. On the contrary, using such patterns individually, without correlating network traffic monitored by software bus application 600 with database transactions indicated by database catalogs, might allow for mapping of software bus application 600 to database manager 802, but might not unambiguously allow the databases used by a particular application to be identified.

VIII. Example Operations

Figure 10:
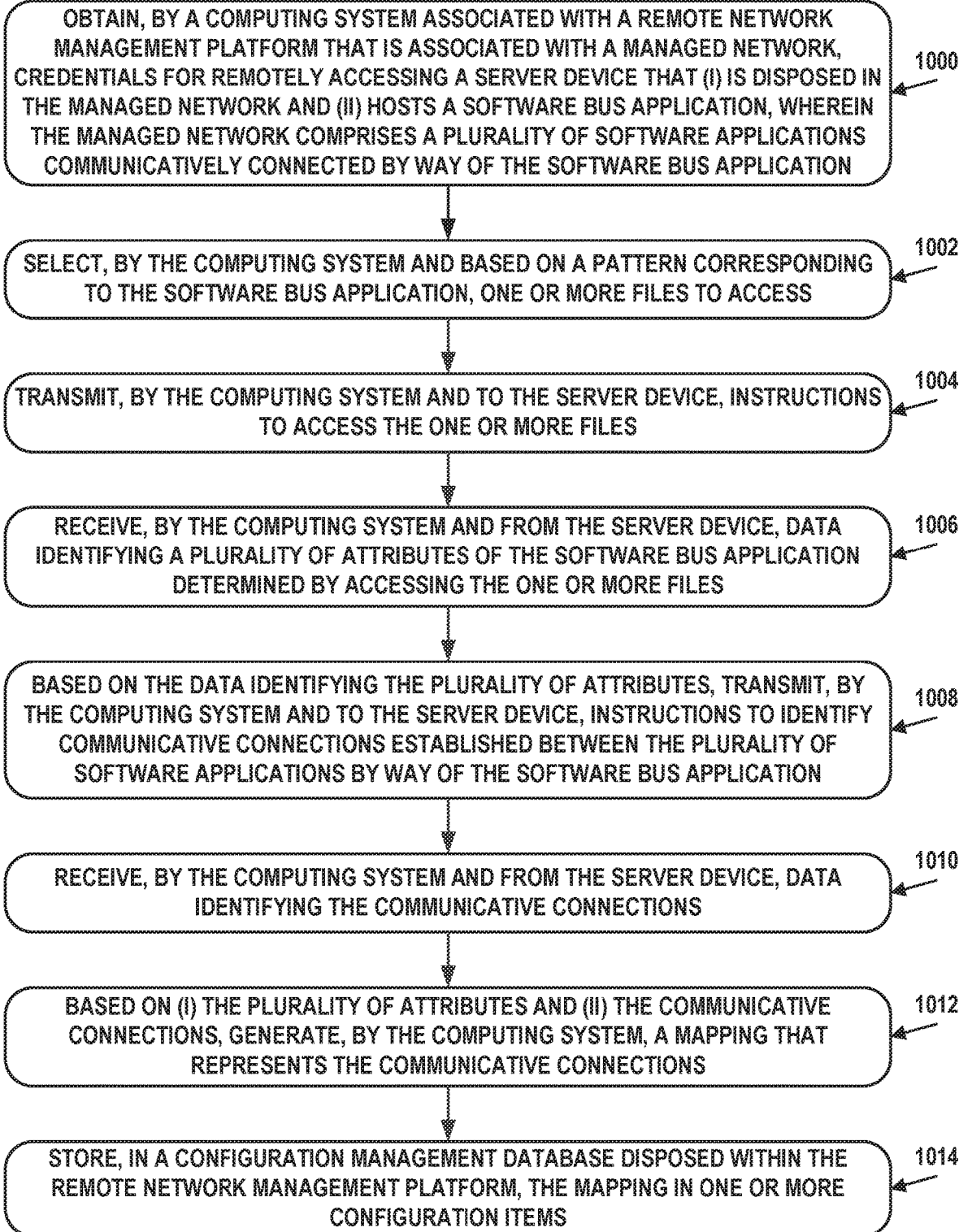
FIG. 10 is a flow chart, in accordance with example embodiments.
Figure 11:
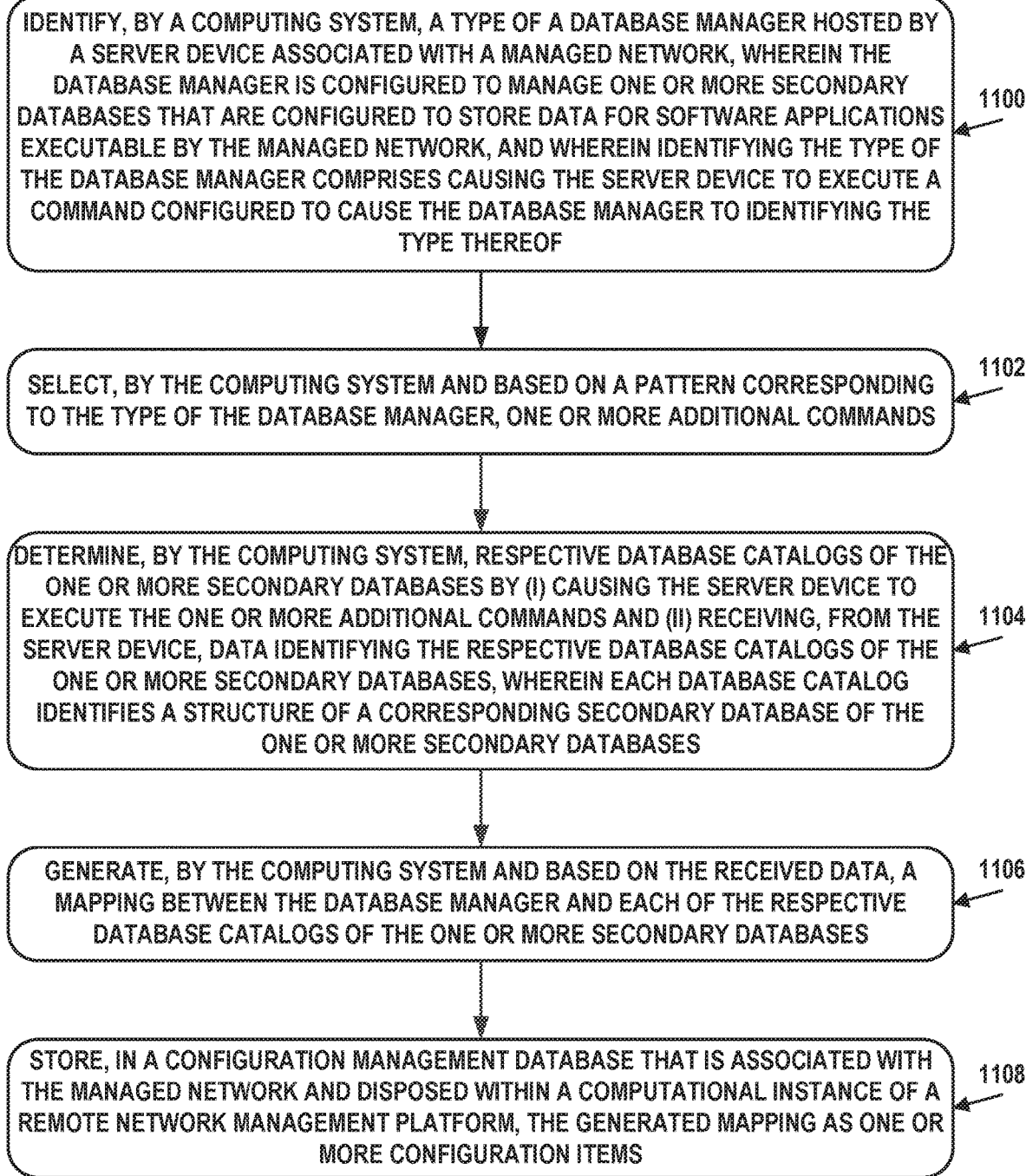
FIG. 11 is a flow chart, in accordance with example embodiments.

FIGS. 10 and 11 are flow charts illustrating an example embodiment. The processes illustrated by FIGS. 10 and 11 may be carried out by a computing device, such as computing device 100, and/or a cluster of computing devices, such as server cluster 200. However, the processes can be carried out by other types of devices or device subsystems. For example, the processes could be carried out by a portable computer, such as a laptop or a tablet device.

The embodiments of FIGS. 10 and 11 may be simplified by the removal of any one or more of the features shown therein. Further, these embodiments may be combined with features, aspects, and/or implementations of any of the previous figures or otherwise described herein.

Turning now to FIG. 10, block 1000 involves obtaining, by a computing system associated with a remote network management platform that is associated with a managed network, credentials for remotely accessing a server device that (i) is disposed in the managed network and (ii) hosts a software bus application. The managed network includes a plurality of software applications communicatively connected by way of the software bus application.

Block 1002 involves selecting, by the computing system and based on a pattern corresponding to the software bus application, one or more files to access.

Block 1004 involves transmitting, by the computing system and to the server device, instructions to access the one or more files.

Block 1006 involves receiving, by the computing system and from the server device, data identifying a plurality of attributes of the software bus application determined by accessing the one or more files.

Block 1008 involves, based on the data identifying the plurality of attributes, transmitting, by the computing system and to the server device, instructions to identify communicative connections established between the plurality of software applications by way of the software bus application.

Block 1010 involves receiving, by the computing system and from the server device, data identifying the communicative connections.

Block 1012 involves, based on (i) the plurality of attributes and (ii) the communicative connections, generating, by the computing system, a mapping that represents the communicative connections.

Block 1014 involves storing, in a configuration management database disposed within the remote network management platform, the mapping in one or more configuration items.

In some embodiments, the instructions to identify the communicative connections established between the plurality of software applications may be configured to cause the software bus application to identify an active communicative connection between (i) a first software application of the plurality of software applications and (ii) a second software application of the plurality of software applications based on one or more messages exchanged between the first software application and the second software application by way of the software bus application.

In some embodiments, wherein a first subset of the plurality of software applications may be configured to communicate according to a first protocol and a second subset of the plurality of software applications may be configured to communicate according to a second protocol different from the first protocol. The software bus application may be configured to transmit messages between software applications of the first subset and software applications of the second subset by translating the messages between the first protocol and the second protocol.

In some embodiments, based on the data identifying the plurality of attributes, instructions to identify additional communicative connections between the software bus application and a database system used by at last one of (i) the software bus application or (ii) the plurality of software applications may be transmitted to the server device. Data identifying the additional communicative connections may be received from the server device. Based on (i) the plurality of attributes and (ii) the additional communicative connections, an additional mapping that represents the additional communicative connections may be generated. The additional mapping may be stored in one or more additional configuration items in the CMDB.

In some embodiments, the database system may include a database manager and a plurality of secondary databases managed by the database manager. The additional communicative connections may be established between one or more of the plurality of software applications and one or more corresponding databases of the secondary databases by way of the software bus application and the database manager.

In some embodiments, the instructions to identify the additional communicative connections between the software bus application and the database system may be configured to cause the server device to monitor network traffic between the database system and at least one of (i) the plurality of software applications or (ii) the software bus application.

In some embodiments, the plurality of attributes may include one or more network ports used by at least one of (i) the software bus application or (ii) the plurality of software applications to establish the communicative connections.

In some embodiments, the one or more files may include a configuration file that defines settings according to which the software bus application is configured to operate.

In some embodiments, the plurality of attributes may include a type of the software bus application.

In some embodiments, the plurality of attributes may include identifiers of each of the plurality of software applications communicatively connected by way of the software bus application.

In some embodiments, the mapping may represent a relationship between the software bus application and the server device.

In some embodiments, instructions to identify one or more directories that contain the one or more files may be transmitted to the server device. Data identifying the one or more directories may be received from the server device.

In some embodiments, the instructions to identify the one or more directories may be configured to (i) cause the server device to identify one or more executing processes corresponding to the software bus application and (ii) identify the one or more directories based on other attributes associated with the one or more executing processes.

Turning now to FIG. 11, block 1100 involves identifying, by a computing system, a type of a database manager hosted by a server device associated with a managed network. The database manager is configured to manage one or more secondary databases that are configured to store data for software applications executable by the managed network. Identifying the type of the database manager involves causing the server device to execute a command configured to cause the database manager to identifying the type thereof.

Block 1102 involves selecting, by the computing system and based on a pattern corresponding to the type of the database manager, one or more additional commands.

Block 1104 involves determining, by the computing system, respective database catalogs of the one or more secondary databases by (i) causing the server device to execute the one or more additional commands and (ii) receiving, from the server device, data identifying the respective database catalogs of the one or more secondary databases. Each database catalog identifies a structure of a corresponding secondary database of the one or more secondary databases.

Block 1106 involves generating, by the computing system and based on the received data, a mapping between the database manager and each of the respective database catalogs of the one or more secondary databases.

Block 1108 involves storing, in a configuration management database that is associated with the managed network and disposed within a computational instance of a remote network management platform, the generated mapping as one or more configuration items.

In some embodiments, based on a plurality of network connection parameters associated with the database manager, communicative connections between the software applications and the database manager may be identified. An additional mapping may be generated to indicate the communicative connections.

In some embodiments, the server device may be caused to identify a directory containing files associated with the database manager. Based on the pattern corresponding to the type of the database manager, one or more files may be selected to access within the directory to determine the plurality of network connection parameters associated with the database manager. Instructions to access the one or more files may be transmitted to the server device. Additional data identifying the plurality of network connection parameters may be received from the server device.

In some embodiments, the software applications may be communicatively connected by way of a software bus application. The additional mapping may indicate that the communicative connections between the software applications and the database manager are by way of the software bus application.

In some embodiments, the additional mapping may indicate, for each software application of the software applications, a corresponding communicative connection with a respective secondary database of the one or more secondary databases.

In some embodiments, the type of the database manager may indicate a provider of the database manager.

In some embodiments, the type of the database manager may indicate a name of the database manager.

In some embodiments, the type of the database manager may indicate a release version of the database manager.

In some embodiments, the respective database catalog of a particular database of the one or more secondary databases may include metadata identifying respective times of transactions between the particular database and one or more of the software applications.

In some embodiments, the respective database catalog of a particular database of the one or more secondary databases may include metadata identifying (i) tables that make up the particular database, (ii) columns that make of the tables, and (iii) data types stored in each of the columns.

In some embodiments, the command may include at least one of (i) instructions configured to cause the server device to identify parameters of one or more software processes associated with the database manager, (ii) instructions configured to cause the server device to access one or more files associated with the database manager, or (iii) instructions configured to cause the server device to invoke execution of one or more operations of an application programming interface provided by the database manager.

In some embodiments, a first database catalog of a particular database of the one or more secondary databases may indicate that the particular database is configured to store data according to a relational database model. A second database catalog of another database of the one or more secondary databases may indicate that the another database is configured to store data according to an object-relational database model. The mapping may indicate a respective database model for each of the one or more secondary databases.

In some embodiments, a communicative connection may be established with the server device based on access credentials. In response to establishing the communicative connection with the server device, the server device may be probed for software products configured to execute thereon. Based on the software products identified by the probes, the command may be determined.

IX. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computing system comprising:
    a configuration management database (CMDB) disposed within a computational instance of a remote network management platform, wherein the computational instance is associated with a managed network that comprises a plurality of software applications communicatively connected by way of a software bus application;
    a discovery application configured to:
        obtain credentials for remotely accessing a server device that (i) is disposed in the managed network and (ii) hosts the software bus application, the credentials being used to establish a connection to the server device;
        responsive to establishing the connection and based on one or more probes, identify a pattern corresponding to the software bus application;
        select, based on the pattern, one or more files to access;
        transmit, to the server device, instructions to access the one or more files;
        receive, from the server device, data identifying a plurality of attributes of the software bus application determined by accessing the one or more files;
        based on the data identifying the plurality of attributes, transmit, to the server device, instructions to identify communicative connections established between the plurality of software applications by way of the software bus application;
        receive, from the server device, data identifying the communicative connections;
        based on (i) the plurality of attributes and (ii) the communicative connections, generate a mapping that represents the communicative connections; and
        store, in the CMDB, the mapping in one or more configuration items.

2. The computing system of claim 1, wherein the instructions to identify the communicative connections established between the plurality of software applications are configured to cause the software bus application to identify an active communicative connection between (i) a first software application of the plurality of software applications and (ii) a second software application of the plurality of software applications based on one or more messages exchanged between the first software application and the second software application by way of the software bus application.

3. The computing system of claim 1, wherein a first subset of the plurality of software applications are configured to communicate according to a first protocol, wherein a second subset of the plurality of software applications are configured to communicate according to a second protocol different from the first protocol, and wherein the software bus application is configured to transmit messages between software applications of the first subset and software applications of the second subset by translating the messages between the first protocol and the second protocol.

4. The computing system of claim 1, wherein the discovery application is further configured to:
    based on the data identifying the plurality of attributes, transmit, to the server device, instructions to identify additional communicative connections between the software bus application and a database system used by at last one of (i) the software bus application or (ii) the plurality of software applications;
    receive, from the server device, data identifying the additional communicative connections;
    based on (i) the plurality of attributes and (ii) the additional communicative connections, generate an additional mapping that represents the additional communicative connections; and
    store, in the CMDB, the additional mapping in one or more additional configuration items.

5. The computing system of claim 4, wherein the database system comprises a database manager and a plurality of secondary databases managed by the database manager, and wherein the additional communicative connections are established between one or more of the plurality of software applications and one or more corresponding databases of the plurality of secondary databases by way of the software bus application and the database manager.

6. The computing system of claim 4, wherein the instructions to identify the additional communicative connections between the software bus application and the database system are configured to cause the server device to monitor network traffic between the database system and at least one of (i) the plurality of software applications or (ii) the software bus application.

7. The computing system of claim 4, wherein the plurality of attributes comprise one or more network ports used by at least one of (i) the software bus application or (ii) the plurality of software applications to establish the communicative connections.

8. The computing system of claim 1, wherein the one or more files comprise a configuration file that defines settings according to which the software bus application is configured to operate.

9. The computing system of claim 1, wherein the plurality of attributes comprise a type of the software bus application.

10. The computing system of claim 1, wherein the plurality of attributes comprise identifiers of each of the plurality of software applications communicatively connected by way of the software bus application.

11. The computing system of claim 1, wherein the mapping represents a relationship between the software bus application and the server device.

12. The computing system of claim 1, wherein the discovery application is further configured to:
transmit, to the server device, instructions to identify one or more directories that contain the one or more files; and
receive, from the server device, data identifying the one or more directories.

13. The computing system of claim 12, wherein the instructions to identify the one or more directories are configured to (i) cause the server device to identify one or more executing processes corresponding to the software bus application and (ii) identify the one or more directories based on other attributes associated with the one or more executing processes.

14. A method comprising:
obtaining, by a computing system associated with a remote network management platform that is associated with a managed network, credentials for remotely accessing a server device that (i) is disposed in the managed network and (ii) hosts a software bus application, wherein the managed network comprises a plurality of software applications communicatively connected by way of the software bus application, the credentials being used to establish a connection to the server device;
responsive to establishing the connection and based on one or more probes, identifying, by the computing system, a pattern corresponding to the software bus application;
selecting, by the computing system and based on the pattern, one or more files to access;
transmitting, by the computing system and to the server device, instructions to access the one or more files;
receiving, by the computing system and from the server device, data identifying a plurality of attributes of the software bus application determined by accessing the one or more files;
based on the data identifying the plurality of attributes, transmitting, by the computing system and to the server device, instructions to identify communicative connections established between the plurality of software applications by way of the software bus application;
receiving, by the computing system and from the server device, data identifying the communicative connections;
based on (i) the plurality of attributes and (ii) the communicative connections, generating, by the computing system, a mapping that represents the communicative connections; and
storing, in a configuration management database (CMDB) disposed within the remote network management platform, the mapping in one or more configuration items.

15. The method of claim 14, wherein the instructions to identify the communicative connections established between the plurality of software applications are configured to cause the software bus application to identify an active communicative connection between (i) a first software application of the plurality of software applications and (ii) a second software application of the plurality of software applications based on one or more messages exchanged between the first software application and the second software application by way of the software bus application.

16. The method of claim 14, further comprising:
based on the data identifying the plurality of attributes, transmitting, by the computing system and to the server device, instructions to identify additional communicative connections between the software bus application and a database system used by at last one of (i) the software bus application or (ii) the plurality of software applications;
receiving, by the computing system and from the server device, data identifying the additional communicative connections;
based on (i) the plurality of attributes and (ii) the additional communicative connections, generating, by the computing system, an additional mapping that represents the additional communicative connections; and
storing, in the CMDB, the additional mapping in one or more additional configuration items.

17. The method of claim 16, wherein the database system comprises a database manager and a plurality of secondary databases managed by the database manager, and wherein the additional communicative connections are established between one or more of the plurality of software applications and one or more corresponding databases of the plurality of secondary databases by way of the software bus application and the database manager.

18. The method of claim 16, wherein the instructions to identify the additional communicative connections between the software bus application and the database system are configured to cause the server device to monitor network traffic between the database system and at least one of (i) the plurality of software applications or (ii) the software bus application.

19. An article of manufacture including a non-transitory computer-readable medium, having stored thereon program instructions that, upon execution by a computing system, cause the computing system to perform operations comprising:
obtaining credentials for remotely accessing a server device that (i) is disposed in a managed network and (ii) hosts a software bus application, wherein the managed network comprises a plurality of software applications communicatively connected by way of the software bus application, the credentials being used to establish a connection to the server device;

responsive to establishing the connection and based on one or more probes, identifying a pattern corresponding to the software bus application;

selecting, based on the pattern, one or more files to access;

transmitting, to the server device, instructions to access the one or more files;

receiving, from the server device, data identifying a plurality of attributes of the software bus application determined by accessing the one or more files;

based on the data identifying the plurality of attributes, transmitting, to the server device, instructions to identify communicative connections established between the plurality of software applications by way of the software bus application;

receiving, from the server device, data identifying the communicative connections;

based on (i) the plurality of attributes and (ii) the communicative connections, generating a mapping that represents the communicative connections; and storing, in a configuration management database (CMDB) disposed within a remote network management platform associated with the managed network, the mapping in one or more configuration items.

20. The article of manufacture of claim 19, wherein the operations further comprise:

based on the data identifying the plurality of attributes, transmitting, to the server device, instructions to identify additional communicative connections between the software bus application and a database system used by at last one of (i) the software bus application or (ii) the plurality of software applications;

receiving, from the server device, data identifying the additional communicative connections;

based on (i) the plurality of attributes and (ii) the additional communicative connections, generating an additional mapping that represents the additional communicative connections; and storing, in the CMDB, the additional mapping in one or more additional configuration items.

* * * * *